United States Patent
Stoehr et al.

(10) Patent No.: US 12,030,341 B2
(45) Date of Patent: Jul. 9, 2024

(54) CASTER BRAKING SYSTEM TECHNOLOGY

(71) Applicant: OMCO SUMO, INC., Oconomowoc, WI (US)

(72) Inventors: Kyle C. Stoehr, Okauchee, WI (US); David A. Neis, Oconomowoc, WI (US)

(73) Assignee: OMCO SUMO, INC., Oconomowoc, WI (US)

( * ) Notice: Subject to any disclaimer, the term of this patent is extended or adjusted under 35 U.S.C. 154(b) by 0 days.

(21) Appl. No.: 16/199,882

(22) Filed: Nov. 26, 2018

(65) Prior Publication Data
US 2019/0160869 A1    May 30, 2019

Related U.S. Application Data

(60) Provisional application No. 62/591,149, filed on Nov. 27, 2017.

(51) Int. Cl.
*B60B 33/00* (2006.01)
*B60B 19/00* (2006.01)

(52) U.S. Cl.
CPC .......... *B60B 33/0086* (2013.01); *B60B 19/00* (2013.01)

(58) Field of Classification Search
CPC ........... B60B 33/0042; B60B 33/0047; B60B 33/0078; B60B 33/0086
See application file for complete search history.

(56) References Cited

U.S. PATENT DOCUMENTS

| | | | |
|---|---|---|---|
| 11,506 A | 8/1854 | White | |
| 285,912 A | 10/1883 | Meehan | |
| 978,161 A | * 12/1910 | Holmes | ............... B60B 33/0028 16/40 |
| 1,429,118 A | 9/1922 | Townsend | |

(Continued)

FOREIGN PATENT DOCUMENTS

| | | |
|---|---|---|
| CH | 477999 A | 9/1969 |
| CN | 100556716 C | 11/2009 |

(Continued)

OTHER PUBLICATIONS

Decker, Eric, "Ball Bearings," Oct. 16, 2009, www.biztimes.com/news/2009/10/16/ball-bearings, 3 pages.

(Continued)

*Primary Examiner* — Emily M Morgan
(74) *Attorney, Agent, or Firm* — FREDRIKSON & BYRON, P.A.

(57) ABSTRACT

The invention provides a caster having a wheel and a wheel lock assembly that is configured to lock the wheel against rotation about a first axis. The wheel lock assembly allows the caster to move between a locked configuration, in which the wheel is engaged by a detent of the wheel lock assembly, and an unlocked configuration, in which the detent is spaced from the wheel. In certain embodiments, the caster moves between its locked and unlocked configurations in response to rotation of a rotatable cam. Other embodiments provide a wheel lock assembly including a rotatable track wall, which comprises a generally cylindrical wall configured to rotate about a second axis. In such embodiments, the caster is configured such that the rotatable track wall rotates about the second axis when the caster moves between locked and unlocked configurations.

15 Claims, 22 Drawing Sheets

(56) References Cited

U.S. PATENT DOCUMENTS

| | | |
|---|---|---|
| 1,458,812 A | 6/1923 | Fay |
| 1,617,085 A | 2/1927 | Specht |
| 1,632,435 A | 6/1927 | Raleigh |
| 1,665,882 A | 4/1928 | Jarvis et al. |
| 1,697,485 A | 1/1929 | Ware |
| 1,761,319 A | 6/1930 | Vollmer |
| RE17,950 E | 2/1931 | Herold |
| 1,827,320 A | 10/1931 | Kusterle |
| 1,879,429 A | 9/1932 | Noelting et al. |
| 2,076,239 A | 4/1937 | Lemmon |
| 2,544,924 A | 3/1951 | Herold |
| 2,701,740 A | 2/1955 | Norman |
| 2,970,673 A | 2/1961 | Isbell |
| 2,973,546 A | 3/1961 | Roche |
| 2,998,287 A | 8/1961 | Pritchett |
| 3,128,495 A | 4/1964 | Tooth |
| 3,166,781 A | 1/1965 | Schultz, Jr. |
| 3,197,802 A | 8/1965 | Fontana et al. |
| 3,210,795 A | 10/1965 | Fontana |
| 3,230,575 A | 1/1966 | Schultz, Jr. |
| 3,397,938 A | 8/1968 | Juelss |
| 3,526,921 A | 9/1970 | Aupke |
| 3,571,842 A | 3/1971 | Fricke |
| 3,588,206 A | 6/1971 | Frost |
| 3,755,852 A | 9/1973 | Greene |
| 3,807,817 A | 4/1974 | Black |
| 3,834,006 A | 9/1974 | Greene |
| 3,890,668 A | 6/1975 | Stosberg et al. |
| 3,971,601 A | 7/1976 | Sytsma |
| 3,977,040 A | 8/1976 | Sugasawara |
| 3,997,938 A | 12/1976 | Pinaire et al. |
| 4,019,789 A | 4/1977 | Rosin et al. |
| 4,037,292 A | 7/1977 | Lapham |
| 4,045,096 A | 8/1977 | Lidov |
| 4,054,335 A | 10/1977 | Timmer |
| 4,068,342 A | 1/1978 | Carrier |
| 4,086,680 A | 5/1978 | Kelly |
| 4,109,343 A | 8/1978 | Weis et al. |
| 4,110,866 A | 9/1978 | Ishii |
| 4,129,921 A | 12/1978 | Greene |
| 4,219,240 A | 8/1980 | Brandenstein et al. |
| 4,219,904 A | 9/1980 | Melara |
| 4,282,629 A | 8/1981 | Demrick et al. |
| 4,348,785 A | 9/1982 | Jordan |
| 4,361,930 A | 12/1982 | Seesengood |
| 4,367,905 A | 1/1983 | Nauta |
| 4,404,707 A | 9/1983 | Walker |
| 4,409,715 A | 10/1983 | Timmer |
| 4,465,321 A | 8/1984 | Berg |
| 4,479,566 A | 10/1984 | Ishii |
| 4,484,525 A | 11/1984 | Forshee et al. |
| 4,490,128 A | 12/1984 | Weiss et al. |
| 4,534,749 A | 8/1985 | Rudiger et al. |
| 4,535,196 A | 8/1985 | Milne |
| 4,544,425 A | 10/1985 | Provolo |
| 4,693,698 A | 9/1987 | Olson, II |
| 4,706,329 A | 11/1987 | Screen |
| 4,720,894 A | 1/1988 | Deasy et al. |
| 4,788,741 A | 12/1988 | Hilborn |
| 4,793,021 A | 12/1988 | Deasy |
| 4,916,801 A | 4/1990 | Cooper |
| 4,993,538 A | 2/1991 | Norbury |
| 5,062,178 A | 11/1991 | Chiu |
| 5,066,145 A | 11/1991 | Sibley et al. |
| 5,068,943 A | 12/1991 | Estkowski et al. |
| 5,078,221 A | 1/1992 | Rewitzer |
| 5,119,525 A | 6/1992 | Melara |
| 5,181,587 A | 1/1993 | Masatoshi |
| 5,199,131 A | 4/1993 | Harris |
| 5,226,739 A | 7/1993 | Estkowski et al. |
| 5,230,571 A | 7/1993 | Estkowski et al. |
| 5,232,071 A | 8/1993 | Kawanabe |
| 5,248,019 A | 9/1993 | Sbarro |
| 5,263,238 A | 11/1993 | Cooper |
| 5,275,472 A | 1/1994 | Hicks |
| 5,277,126 A | 1/1994 | Wendt et al. |
| 5,303,449 A | 4/1994 | Gray |
| D347,161 S | 5/1994 | Conaway et al. |
| 5,357,868 A | 10/1994 | Mass |
| 5,366,406 A | 11/1994 | Hobbel et al. |
| 5,368,133 A | 11/1994 | Yang |
| 5,390,393 A | 2/1995 | Reppert et al. |
| 5,408,723 A | 4/1995 | Julien |
| 5,419,619 A | 5/1995 | Lew |
| 5,490,719 A | 2/1996 | Lew |
| 5,493,755 A | 2/1996 | Kindstrand et al. |
| 5,566,623 A | 10/1996 | Wareham |
| 5,568,671 A | 10/1996 | Harris et al. |
| 5,690,395 A | 11/1997 | Hicks |
| 5,871,286 A | 2/1999 | Kern et al. |
| 6,179,701 B1 | 1/2001 | Tieleman |
| 6,336,685 B1 | 1/2002 | Orr |
| 6,601,271 B1 | 8/2003 | Sommerfeld et al. |
| 6,619,438 B1 | 9/2003 | Yang |
| 6,748,623 B1 | 6/2004 | Tsai |
| 6,810,561 B1 | 11/2004 | Liu |
| 6,839,939 B2 | 1/2005 | Donakowski |
| 6,854,893 B2 | 2/2005 | Schmidt |
| 6,880,203 B1 | 4/2005 | Aubin |
| 6,915,745 B2 | 7/2005 | Carder |
| 7,041,020 B2 | 5/2006 | Singer |
| 7,150,070 B2 | 12/2006 | Donakowski |
| 7,207,084 B2 | 4/2007 | Melara |
| 7,392,581 B2 | 7/2008 | Sano et al. |
| 7,435,005 B2 | 10/2008 | Schmidl et al. |
| 7,448,807 B2 | 11/2008 | Schenk et al. |
| 7,647,673 B2 | 1/2010 | Melara |
| 7,657,969 B2 | 2/2010 | Trivini |
| 8,272,469 B2 | 9/2012 | Stoehr et al. |
| 8,375,515 B2 | 2/2013 | Hozumi et al. |
| 8,393,053 B2 | 3/2013 | Melara |
| 8,522,397 B1* | 9/2013 | Tsai .................... B60B 33/0042 |
| | | 16/35 R |
| 8,549,705 B1 | 10/2013 | Wu |
| 8,561,258 B2 | 10/2013 | Breyer et al. |
| 8,702,178 B2 | 4/2014 | Breyer et al. |
| D731,878 S | 6/2015 | Lindsay et al. |
| 9,168,689 B2 | 10/2015 | Stoehr |
| 9,266,393 B2 | 2/2016 | Yeo |
| 9,387,723 B2* | 7/2016 | Beatty .................. B60B 33/021 |
| 9,630,450 B1 | 4/2017 | Chang |
| 9,669,658 B1 | 6/2017 | Tong |
| D795,045 S | 8/2017 | Diz et al. |
| 10,035,376 B2 | 7/2018 | Stoehr |
| 10,059,148 B2 | 8/2018 | Lai |
| 10,595,607 B1* | 3/2020 | Wang .................... A45C 5/14 |
| 2002/0178539 A1 | 12/2002 | Donakowski |
| 2003/0163892 A1* | 9/2003 | Kausemann ........ B60B 33/0068 |
| | | 16/18 R |
| 2004/0140160 A1 | 7/2004 | Carder |
| 2005/0081329 A1 | 4/2005 | Tsai |
| 2007/0044273 A1 | 3/2007 | Milbredt |
| 2007/0107160 A1 | 5/2007 | Jane Santamaria |
| 2007/0143958 A1 | 6/2007 | Trivini |
| 2007/0186373 A1* | 8/2007 | Melara ................ B60B 33/0068 |
| | | 16/35 R |
| 2008/0163455 A1 | 7/2008 | Tsai |
| 2009/0193621 A1* | 8/2009 | Melara ................ B60B 33/0049 |
| | | 16/35 R |
| 2009/0314596 A1 | 12/2009 | Miyoshi |
| 2010/0077562 A1* | 4/2010 | Block .................. B60B 33/0049 |
| | | 16/46 |
| 2010/0175222 A1* | 7/2010 | Fallshaw ............. B60B 33/0042 |
| | | 16/35 R |
| 2010/0287730 A1 | 11/2010 | Von Bordelius |
| 2010/0306961 A1 | 12/2010 | Breyer |
| 2010/0306962 A1 | 12/2010 | Breyer et al. |
| 2011/0144848 A1 | 6/2011 | Yoshizue et al. |
| 2011/0203074 A1 | 8/2011 | Trivini |
| 2011/0232027 A1* | 9/2011 | Block .................. B60B 33/0057 |
| | | 16/20 |
| 2011/0247890 A1 | 10/2011 | Stoehr et al. |
| 2013/0091664 A1 | 4/2013 | Breyer |

(56) References Cited

U.S. PATENT DOCUMENTS

| | | | |
|---|---|---|---|
| 2014/0101891 A1* | 4/2014 | Hofrichter | B60B 33/0078 16/35 R |
| 2014/0238784 A1* | 8/2014 | Yeo | B60B 33/025 188/1.12 |
| 2016/0052339 A1* | 2/2016 | Dayt | B60B 33/0021 16/47 |
| 2016/0107481 A1 | 4/2016 | Stoehr | |
| 2017/0119607 A1* | 5/2017 | Derenne | B60B 33/0086 |
| 2018/0117963 A1 | 5/2018 | Chien et al. | |

FOREIGN PATENT DOCUMENTS

| | | |
|---|---|---|
| DE | 904755 C | 2/1954 |
| DE | 2232752 A1 | 1/1974 |
| DE | 9316374 U1 | 1/1994 |
| DE | 10128099 A1 | 12/2002 |
| EP | 3335903 A1 | 6/2018 |
| FR | 2526909 A1 | 11/1983 |
| GB | 967915 A | 8/1964 |
| GB | 1009817 A | 11/1965 |
| GB | 1418716 A | 12/1975 |
| GB | 2272366 A | 5/1994 |
| JP | S57121902 A | 7/1982 |
| WO | 2005118314 A1 | 12/2005 |
| WO | 2005119074 A1 | 12/2005 |
| WO | 2008034741 A1 | 3/2008 |
| WO | 2018015578 A1 | 1/2018 |

OTHER PUBLICATIONS

International Patent Application No. PCT/US2010/061969, International Search Report and Written Opinion mailed May 26, 2011, 18 pages.

Photograph of Dapec trolley wheels; 1 page; believed to have been in commercial use prior to Dec. 23, 2008.

Photographs of Frost Sani-Trolley wheels; 4 pages; bellevied to have been in commercial use prior to Dec. 23, 2008.

Photograph of Linco trolley wheels; 1 page; believed to have been in commercial use prior to Dec. 23, 2008.

Photographs of Mammoth trolley wheels; 4 pages; believed to have been in commercial use prior to Dec. 23, 2008.

Photograph of Meyn trolley wheel; 1 page; believed to have been in commercial use prior to Dec. 23, 2008.

Photograph of Stork trolley wheels; 1 page; believed to have been in commercial use prior to Dec. 23, 2008.

The Best Designers of the Red Dot Award: Product Design 2006: Roland Kausemann, Frank Newey, Jorg Ostrenrieder and Marcus Widermann: www.en.red-dot.org/1851.htm [accessed on Apr. 29, 2009, 3 pages].

The North American Performance Standard for Casters and Wheels, Institute of Caster and Wheel Manufacturers, 2005, 67 pages.

General Purpose Office Chairs—Tests, American National Standard for Office Furniture, BIFMA International, 2002, 96 pages.

Gross Stabil NoNoise Laufstift: http://www.gross-froelich.de/de/aktuelles/nonoise_laufstift.html, accessed on Aug. 11, 2009; and English Machine translation retrieved from https://web.archive.org/web/20130120173456/http://gross-froelich.de/de/aktuelles/nonoise_laufstift.html on Apr. 8, 2019, 2 pages.

Wagner Casters & Wheels, Div of E.R. Wagner Mfg. Co., Sockets and Brackets, http://catalog.erwagner.com/viewitems/caster-accessories/sockets-and-brackets, accessed on May 27, 2009, 3 pages.

International Patent Application No. PCT/US2006/000895, International Search Report and Written Opinion mailed Oct. 31, 2006, 4 pages.

Form Magazine, No. 122 II, 1988, pp. 20-23, with partial English machine translation, 8 pages.

International Patent Application No. PCT/US2003/015905, International Search Report mailed Oct. 4, 2004, 2 pages.

* cited by examiner

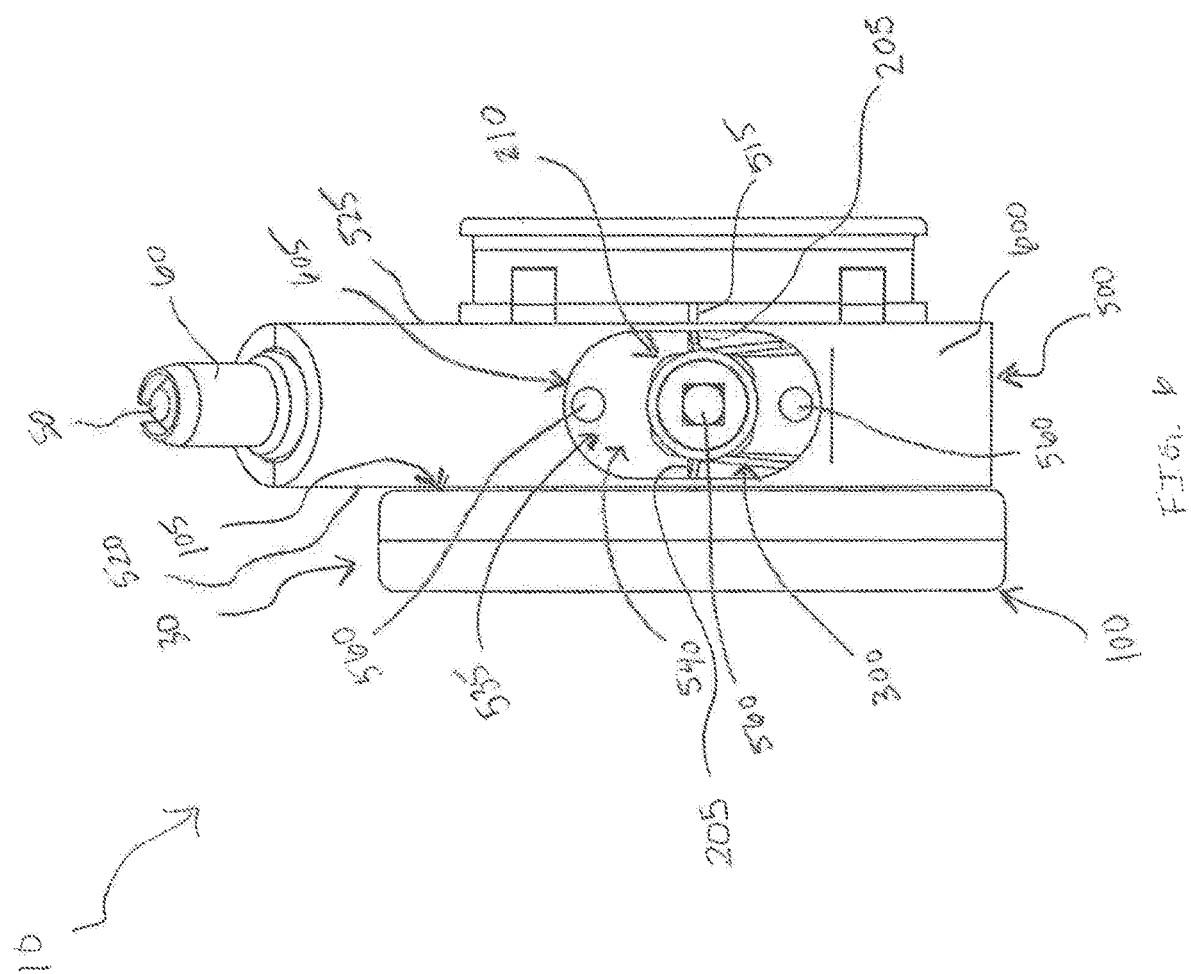

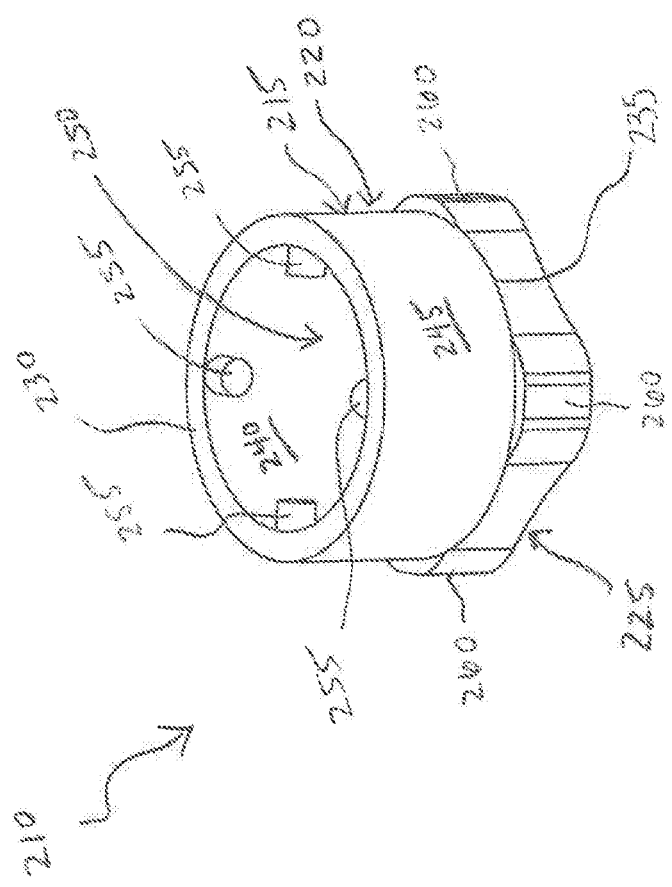

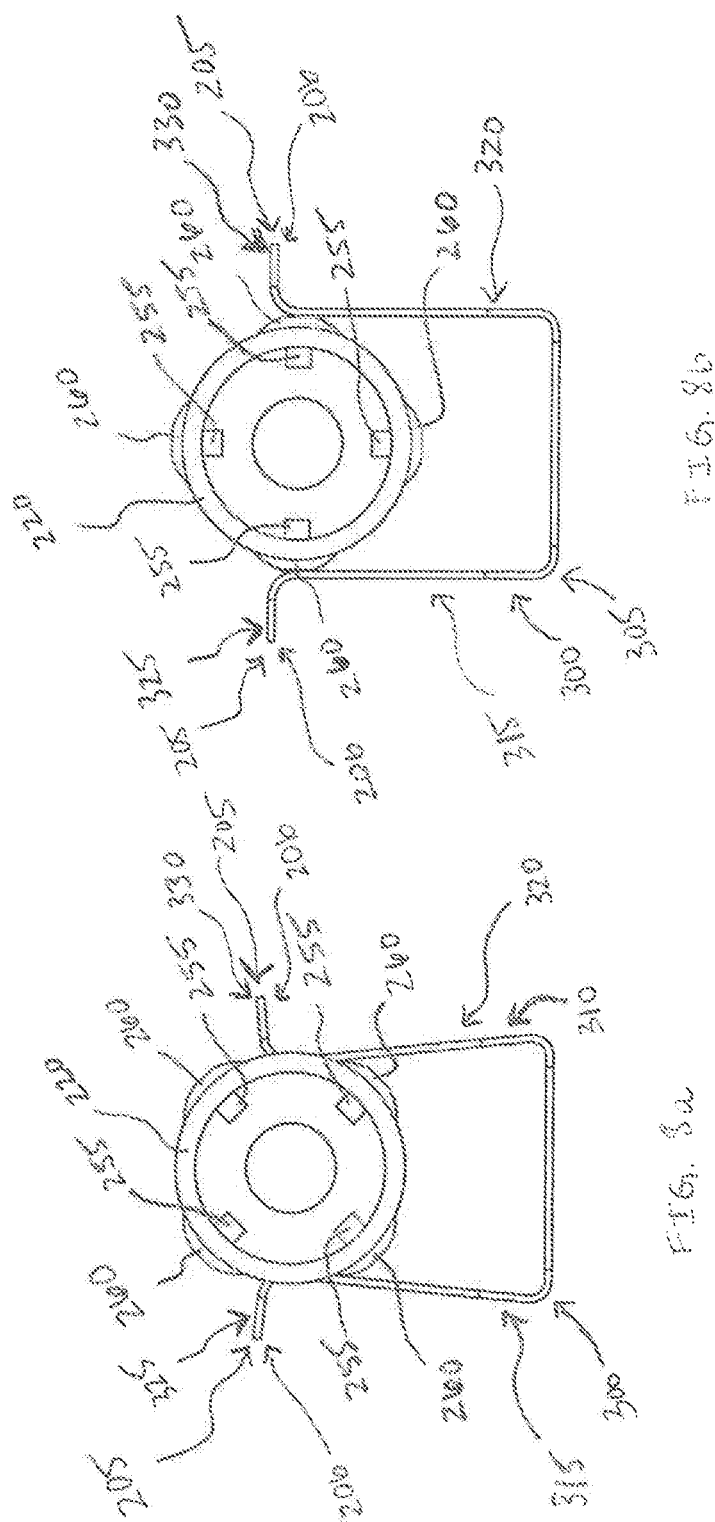

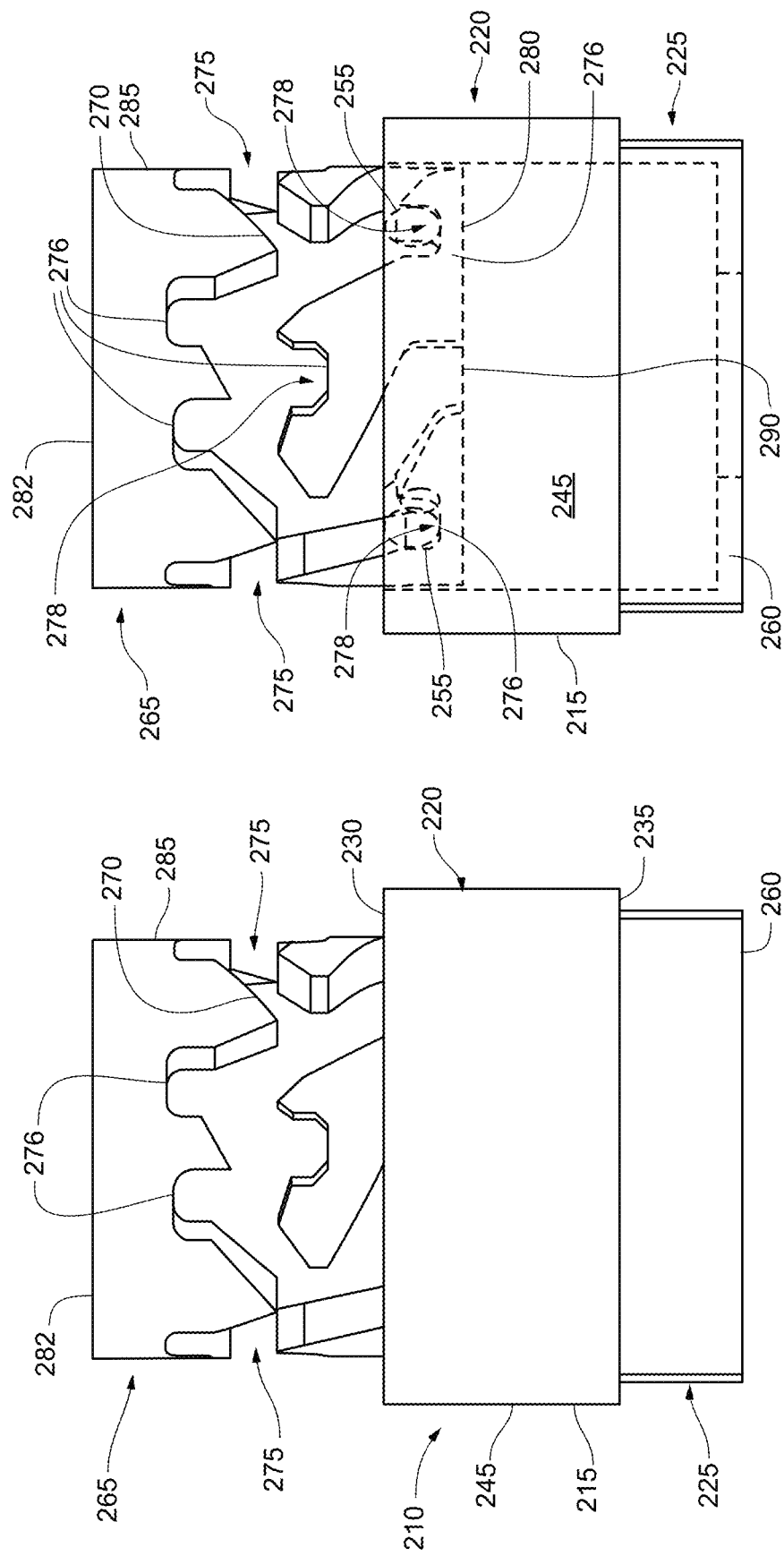

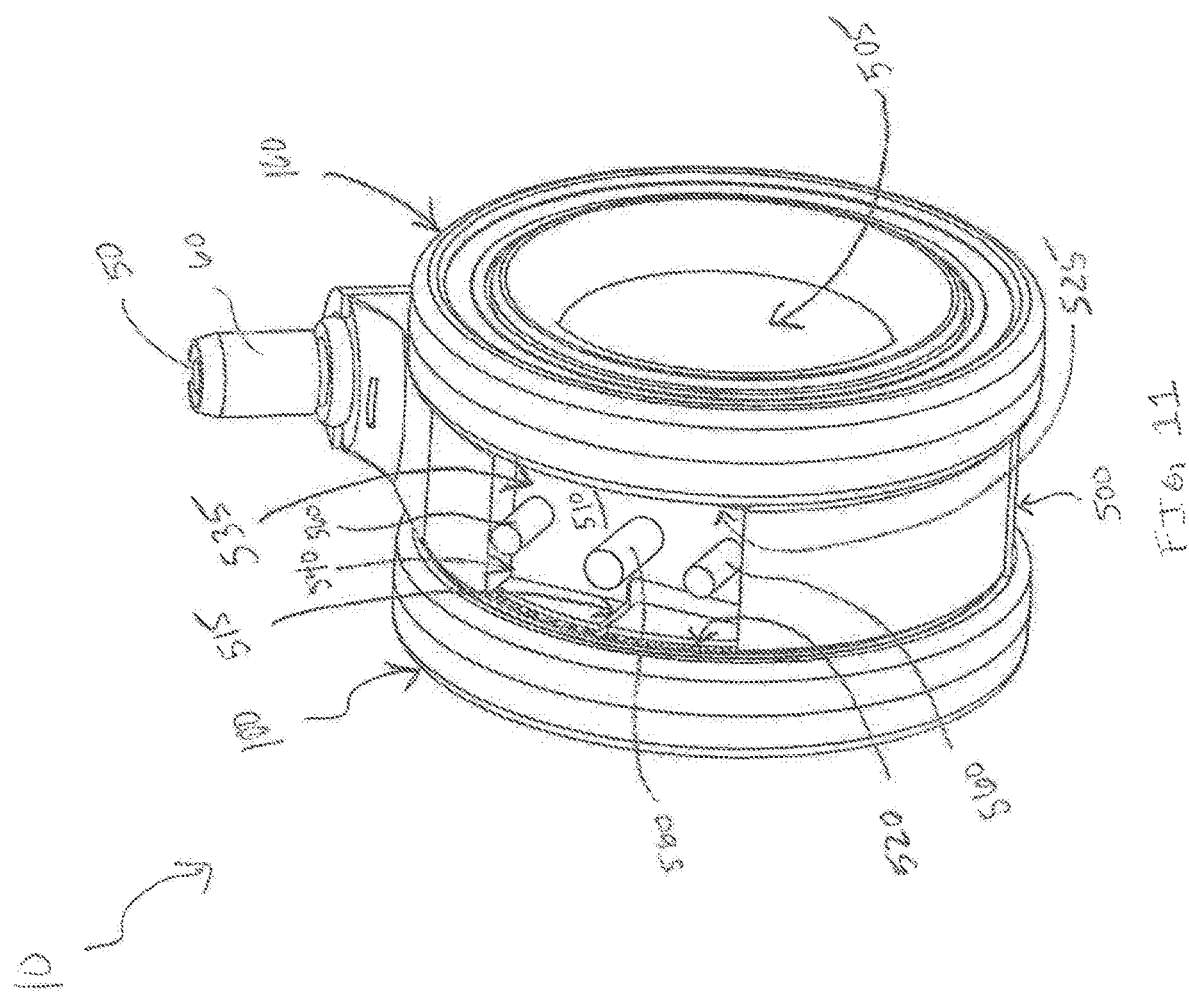

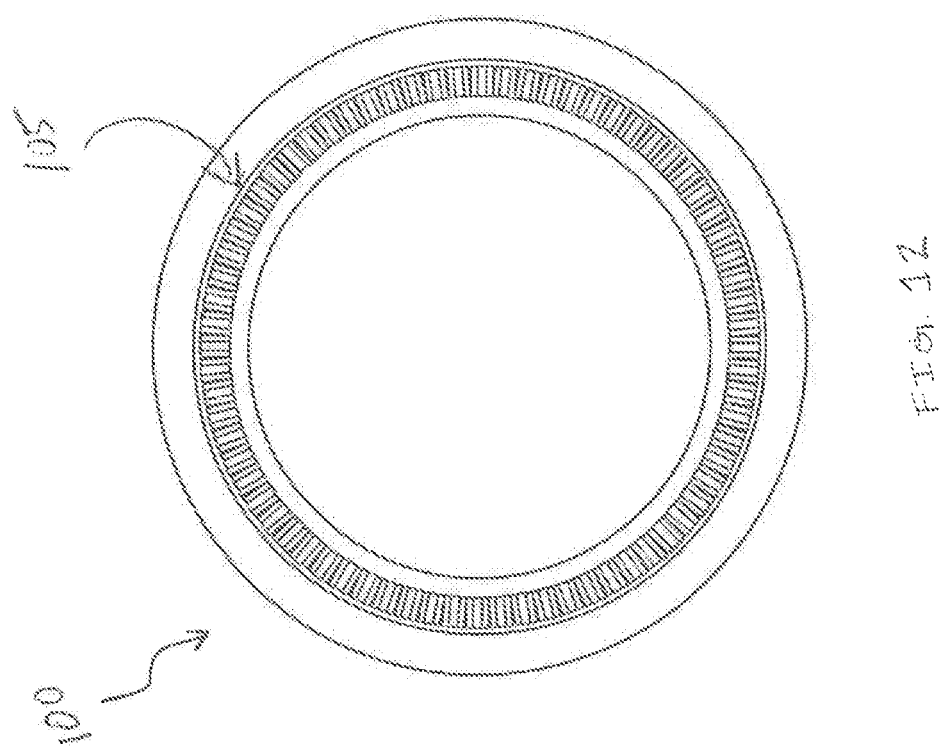

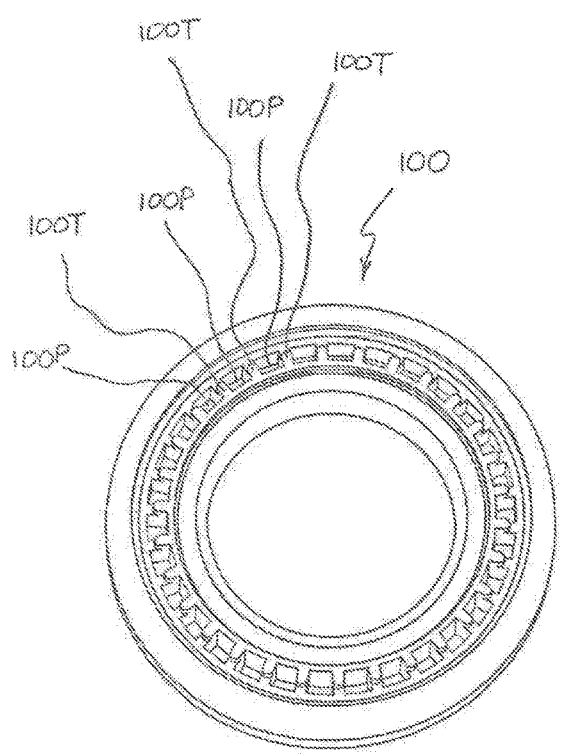
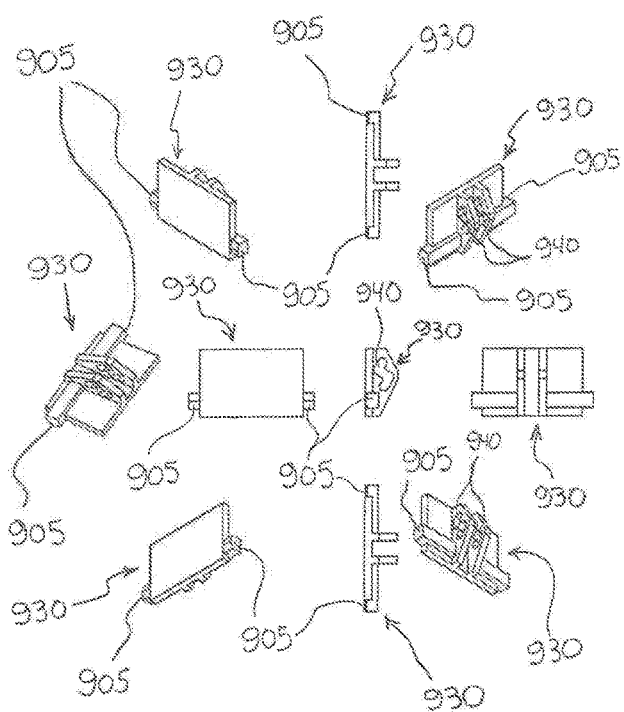
FIG. 21a
FIG. 21b

CASTER BRAKING SYSTEM TECHNOLOGY

CROSS REFERENCE

This application claims the benefit of U.S. Provisional Patent Application No. 62/591,149, filed Nov. 27, 2017, the entire contents of which are incorporated herein by reference.

FIELD OF THE INVENTION

The present invention relates to a caster braking system. More specifically, the present invention provides a caster having at least one wheel and a wheel lock assembly that is configured to lock the wheel against rotation.

BACKGROUND OF THE INVENTION

Caster assemblies are well known. They are attached to an article to facilitate rolling movement of the article. Caster assemblies can be provided on any of a wide variety of articles, including chairs and other furniture (tables, sofas, beds, desks, etc.), computer stands, stands for medical equipment, cabinets, work surfaces, dollies, luggage, and the like.

It would be desirable to provide a caster having a wheel lock assembly that is adjustable between a locked configuration, in which the wheel is positively engaged by a detent of the wheel lock assembly, and an unlocked configuration, in which the detent of the wheel lock assembly is spaced from the wheel. It would also be desirable to provide a caster that overcomes one or more disadvantages of casters known in the prior art.

SUMMARY OF THE INVENTION

Certain embodiments of the present invention provide a caster having a wheel and a wheel lock assembly. The wheel is configured to rotate about a first axis. The wheel lock assembly is configured to lock the wheel against rotation about the first axis. The wheel lock assembly comprises a rotatable cam. The rotatable cam comprises a generally cylindrical wall configured to rotate about a second axis such that the caster has a locked configuration and an unlocked configuration. The caster is configured such that the rotatable cam rotates about the second axis when the caster moves between its locked and unlocked configurations. When the caster is in the locked configuration, the wheel is positively engaged by a detent of the wheel lock assembly such that the wheel is restrained against rotation about the first axis. When the caster is in the unlocked configuration, the detent of the wheel lock assembly is spaced apart from the wheel such that the wheel is free to rotate about the first axis. The rotatable cam is mounted in an axially-fixed location so as to be restrained against moving axially along the second axis when the caster moves between its locked and unlocked configurations.

In some embodiments, the invention provides a hubless caster having a generally annular central frame member, two wheels, a cam-spring-follower lock assembly, and a push button. The generally annular central frame member surrounds an open central corridor. The cam-spring-follower lock assembly is disposed within the push button and located entirely radially outward of a radially-outward-facing base surface of the generally annular central frame member. The hubless caster has a locked configuration and an unlocked configuration. When the hubless caster is in the locked configuration, the two wheels are positively engaged on their respective interior sides by two respective detents of the cam-spring-follower lock assembly such that the two wheels are restrained against rotation. When the hubless caster is in the unlocked configuration, the two detents of the cam-spring-follower lock assembly are spaced apart from the two wheels such that the two wheels are free to rotate.

Some embodiments of the invention provide a caster having two wheels and a wheel lock assembly. Each of the two wheels is configured to rotate about a first axis. The wheel lock assembly comprises a rotatable cam and two fingers. Each of the two fingers projects along an axis that is at least substantially parallel to the first axis. The caster has a locked configuration and an unlocked configuration. When the caster is in the locked configuration, the two wheels are positively engaged respectively on their interior sides by the two fingers such that the two wheels are restrained against rotation about the first axis. When the caster is in the unlocked configuration, the two fingers are spaced apart from the two wheels such that the two wheels are free to rotate about the first axis.

In certain embodiments, the invention provides a hubless caster having a generally annular central frame member, two wheels, a push button, a wrap-around cover, and a wheel lock assembly. The generally annular central frame member surrounds an open central corridor. The generally annular central frame member has a carve-out recess formed therein such that a lock-assembly compartment is provided by the carve-out recess. The lock-assembly compartment is located between the two wheels and is bounded radially inwardly by a radially-outward-facing base surface of the generally annular central frame member and bounded radially outwardly by the push button and the wrap-around cover. The generally annular central frame member has a radially-inward-facing surface that faces toward the open central corridor and thus is opposed to the radially-outward-facing base surface. The wrap-around cover surrounds the push button. The push button is exposed and is configured to be actuated manually.

In some embodiments, the invention provides a caster having a wheel and a wheel lock assembly. The wheel is configured to rotate about a first axis, and the wheel lock assembly is configured to lock the wheel against rotation about the first axis. In the present embodiments, the wheel lock assembly includes a rotatable track wall. The rotatable track wall comprises a generally cylindrical wall configured to rotate about a second axis. When the caster is in the locked configuration, the wheel is positively engaged by a detent of the wheel lock assembly such that the wheel is restrained against rotation about the first axis. When the caster is in the unlocked configuration, the detent of the wheel lock assembly is spaced apart from the wheel such that the wheel is free to rotate about the first axis. In the present embodiments, the caster is configured such that the rotatable track wall rotates about the second axis when the caster moves between its locked and unlocked configurations.

BRIEF DESCRIPTION OF THE DRAWINGS

FIG. 6 is a front view of the hubless caster of FIG. 1 shown in an unlocked configuration such that two end regions of a resilient lock clip are spaced apart from the wheels, with one of the wheels and a push button removed for clarity.

FIG. 7 is a top perspective view of a rotatable cam of the hubless caster of FIG. 1.

FIG. 8a is a top view of the rotatable cam and the resilient lock clip of the hubless caster of FIG. 1, showing the resilient lock clip in an un-deformed state, such that the two end regions of the resilient lock clip are in a resting position and are not under stress from the rotatable cam.

FIG. 8b is a top view of the rotatable cam and the resilient lock clip of the hubless caster of FIG. 1, showing the resilient lock clip in a deformed state, such that the two end regions of the resilient lock clip are bent outwardly under stress from the rotatable cam.

FIG. 9a is a front view of the rotatable cam and a track wall of the hubless caster of FIG. 1, showing the rotatable cam surrounding the track wall.

FIG. 9b is a front view of the rotatable cam and the track wall similar to FIG. 9a, except that the rotatable cam is shown as transparent to illustrate how projections of the rotatable cam are received in a recessed track of the track wall.

FIG. 10d is a cross-sectional view of the push button of FIG. 10c taken along line A-A.

FIG. 11 is a perspective view of the hubless caster of FIG. 1, with the push button, rotatable cam, track wall, resilient lock clip, and a cover removed to show a carve-out recess in a generally annular central frame member.

FIG. 12 is a side view of a wheel of the hubless caster of FIG. 1, showing a series of recesses spaced apart along an interior face of the wheel.

FIG. 21a is a side view of a wheel of the hubless caster of FIG. 15, showing a series of teeth and pockets spaced apart along an interior face of the wheel.

FIG. 21b is a series of images, shown from different perspectives, of a wedge that can be used as part of the wheel locking assembly of the hubless caster of FIG. 15.

DETAILED DESCRIPTION OF VARIOUS EMBODIMENTS

Figure 1:
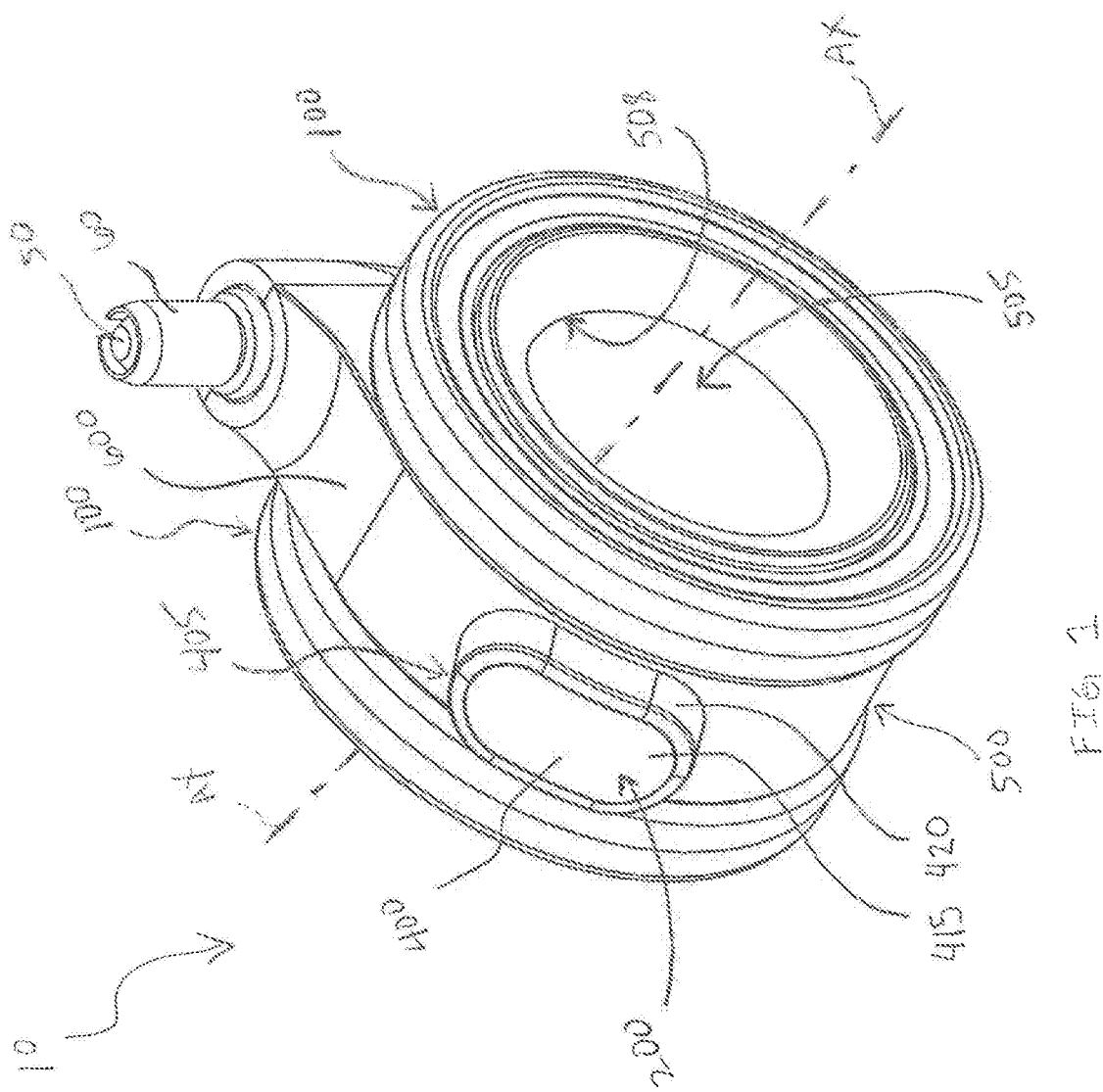
FIG. 1 is a front perspective view of a hubless caster in accordance with certain embodiments of the present disclosure.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 4:
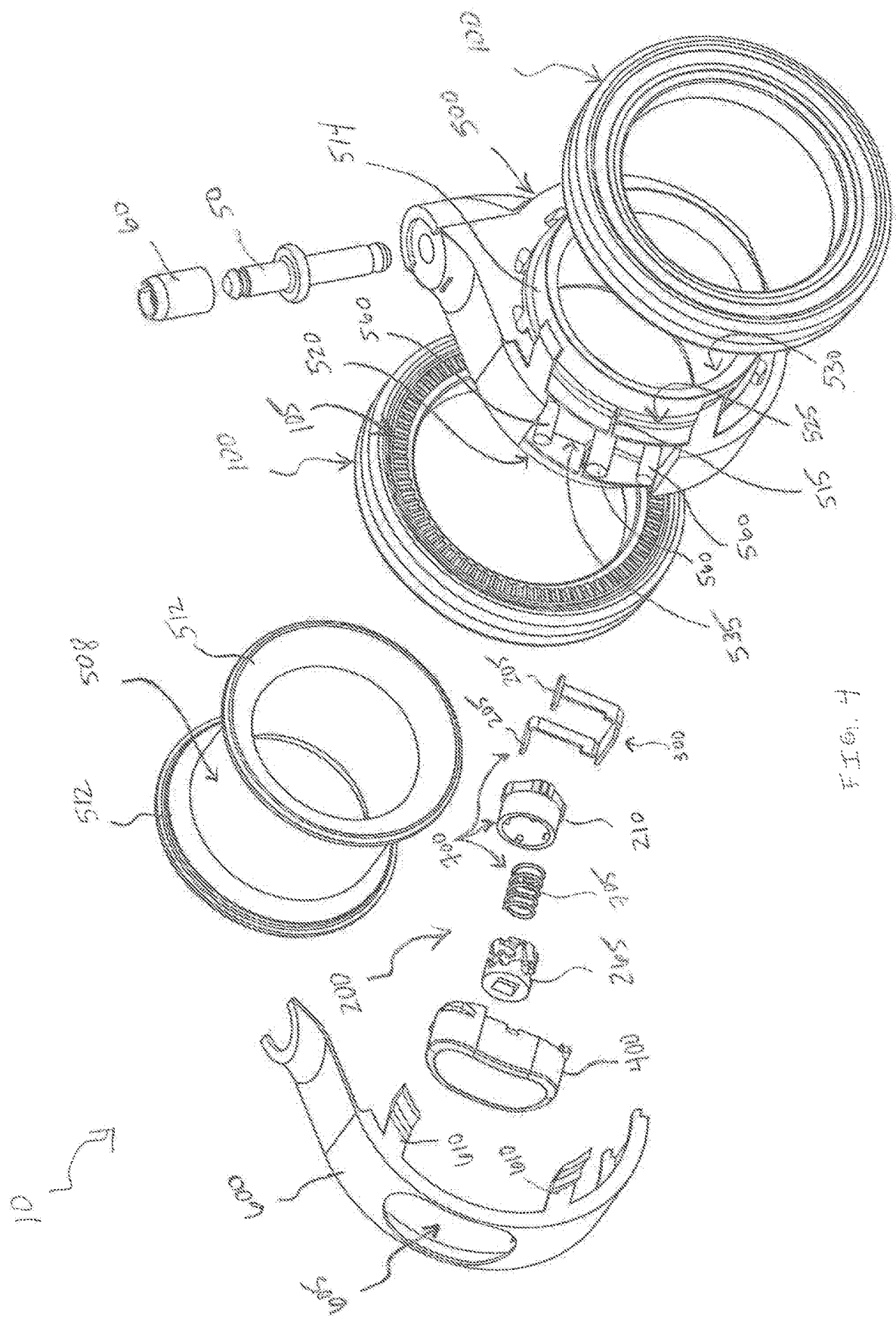
FIG. 4 is an exploded perspective view of the hubless caster of FIG. 1.

Referring to the drawings, and in particular FIG. 1, there is shown a caster of the present disclosure generally represented by reference numeral 10. The caster 10 is configured to be attached to an article (e.g., a chair, table, bed, desk, computer stand, a stand for medical equipment, luggage, or the like) so as to facilitate rolling movement of the article. FIG. 1 shows the caster 10 assembled, whereas FIG. 4 shows the caster 10 disassembled/exploded.

The caster 10 includes a wheel 100 and a wheel lock assembly 200. The wheel 100 is configured to rotate about a first axis AX to enable rolling movement of the caster 10 (e.g., along a floor or the ground). The wheel lock assembly 200 is configured to lock the wheel 100 against rotation about the first axis AX to inhibit (e.g., prevent or at least provide resistance to) rolling movement of the caster 10. Thus, the wheel lock assembly 200 makes the caster 10 adjustable between a locked configuration 20 and an unlocked configuration 30 (see, e.g., FIGS. 5 and 6).

When the caster 10 is in the locked configuration 20 (FIG. 5), the wheel 100 is positively engaged by a detent 205 of the wheel lock assembly 200 such that the wheel 100 is restrained against rotation about the first axis AX. When the caster 10 is in the unlocked configuration 30 (FIG. 6), the detent 205 of the wheel lock assembly 200 is spaced apart from the wheel 100 such that the wheel 100 is free to rotate about the first axis AX.

In certain embodiments, the wheel lock assembly 200 includes a rotatable cam 210 (see FIGS. 4, 6, 7, 8a, 8b, 9a, 9b, 13, and 14). The rotatable cam 210 preferably comprises a generally cylindrical wall 215 configured to rotate about a second axis BX. In the present embodiments, the caster 10 is configured such that the rotatable cam 210 rotates about the second axis BX when the caster 10 is adjusted (e.g., moves) between its locked and unlocked configurations. In some cases, for example, the caster 10 is configured such that it moves between its locked 20 and unlocked 30 configurations in response to rotation of the rotatable cam 210 about the second axis BX.

Figure 2:
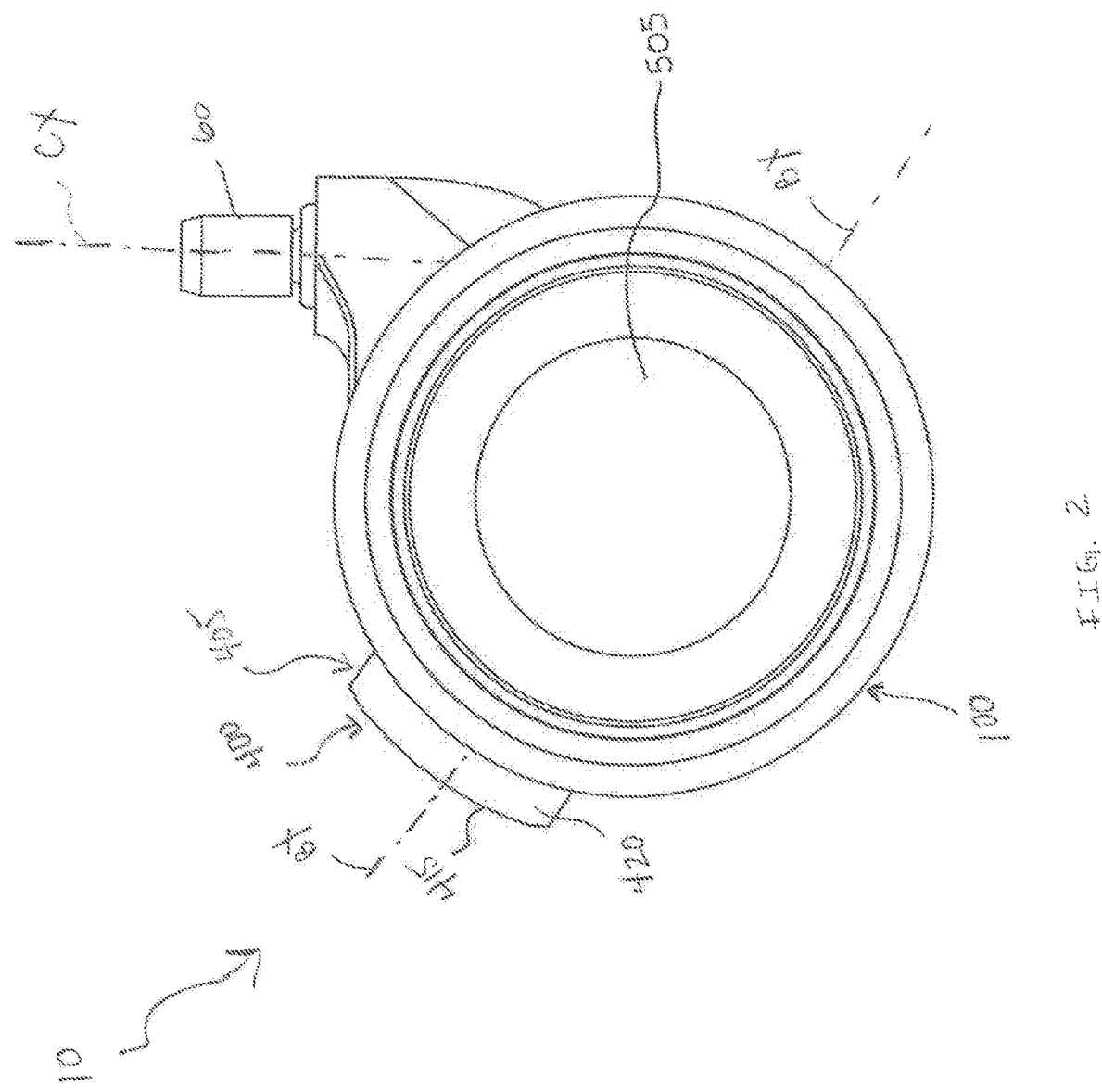
FIG. 2 is a side view of the hubless caster of FIG. 1.
Figure 3:
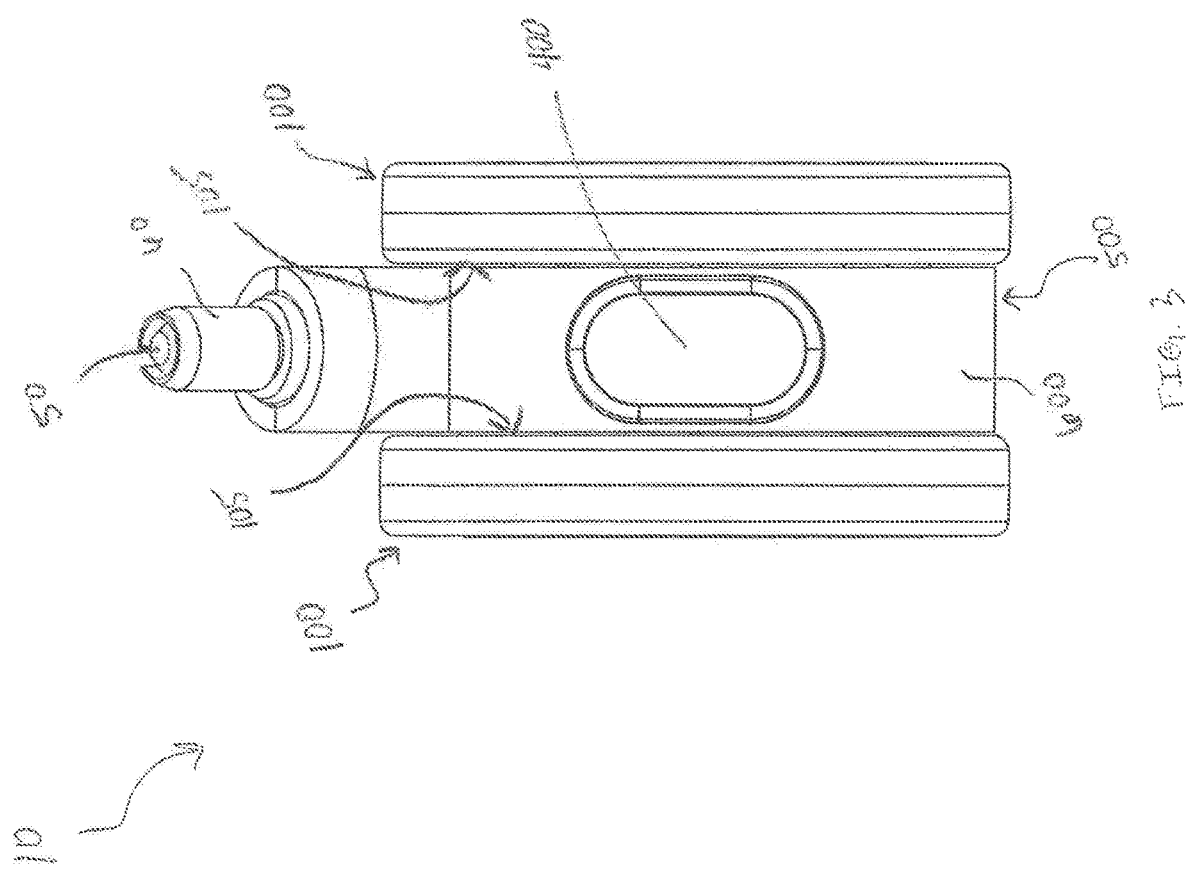
FIG. 3 is a front view of the hubless caster of FIG. 1.

The second axis BX is shown in FIG. 2 and preferably is orthogonal to the first axis AX (about which the wheel 100 rotates). The illustrated second axis BX is parallel to a radial axis of the wheel. This, however, is not required. Instead, the second axis BX can be offset by various angles from being parallel to a radial axis of the wheel.

The rotatable cam 210 preferably is mounted in an axially-fixed location so as to be restrained against moving axially along the second axis BX when the caster 10 is adjusted (e.g., moves) between its locked 20 and unlocked 30 configurations. Thus, the rotatable cam 210 preferably is configured only for rotational (not axial) movement. Such movement or lack thereof is relative to the second axis BX.

One non-limiting configuration for the rotatable cam is shown in FIG. 7. Here, the rotatable cam 210 has an upper portion 220 and a lower portion 225. The upper portion 220 is defined by the generally cylindrical wall 215 of the rotatable cam 210. The generally cylindrical wall 215 has a top 230, a bottom 235, an interior wall surface 240 opposite an exterior wall surface 245, and a hollow interior 250. The top 230 and bottom 235 of the generally cylindrical wall 215 each surround a respective opening to the hollow interior 250.

The rotatable cam 210 preferably has at least two projections 255 (e.g., radially inwardly extending projections). In preferred embodiments, the projections 255 comprise pins that extend radially inwardly from the interior wall surface 240 of the upper portion 220 of the rotatable cam 210. The illustrated projections 255 extend from the generally cylindrical wall 215 adjacent the top 230 of the upper portion 220 of the rotatable cam 210. This, however, is not required. The rotatable cam 210 can have exactly two projections 255 or it can have more than two projections, such as three projections, or four projections as shown in FIGS. 7, 8a, and 8b.

The lower portion 225 of the illustrated rotatable cam 210 has at least one cam shoulder 260 projecting radially outwardly beyond the generally cylindrical wall 215 that defines the upper portion 220 of the rotatable cam 210. The at least one cam shoulder 260 can be a single cam shoulder, or two or more cam shoulders, such as three or four cam shoulders 260 (see FIGS. 7, 8a, and 8b). Although only three cam shoulders 260 are visible in FIG. 7, it will be understood (e.g., from FIGS. 8a and 8b) that the illustrated rotatable cam 260 includes a fourth cam shoulder 260 that is hidden from view in FIG. 7. In the present embodiments, each cam shoulder 260 can optionally be vertically aligned with a respective one of the projections 255. In other cases, the projections and the shoulders are located in offset positions relative to one another.

The details of the rotatable cam shown in FIG. 7 are by no means limiting. For example, the rotatable cam may not have cam shoulders of the type illustrated. In some cases, the rotatable cam has no cam shoulders. In such cases, the illustrated lower portion 225 of the rotatable cam 210 may be omitted. As discussed below, the rotatable cam preferably has at least two projections (e.g., posts), and those projections preferably are configured to serve as cams.

Preferably, the wheel lock assembly 200 further includes a track wall 265. In FIGS. 9a and 9b, the illustrated track wall 265 is generally cylindrical, e.g., so as to conform to the shape of the generally cylindrical wall 215 of the illustrated rotatable cam 210. The track wall 265 has a bottom end 280, a top end 282, and a perimeter wall portion (or "side wall") 285 extending between the top 282 and bottom 280 ends. Preferably, the track wall 265 and the generally cylindrical wall 215 of the rotatable cam 210 are nested one inside the other. In FIGS. 9a and 9b, the generally cylindrical wall 215 of the rotatable cam 210 is positioned so as to surround the track wall 265. If desired, the arrangement can be reversed in that the rotatable cam can be nested inside the track wall. In such cases, the outside diameter of the track wall will be larger than that of the rotatable cam, the projections from the rotatable cam will extend radially outwardly, and the interior surface of the track wall will receive those projections.

The track wall 265 includes a track 270. In some cases, the track 270 is configured such that when the track wall 265 moves axially along the second axis, one or more projections 255 or other parts of the rotatable cam 210 ride along the track, thereby causing the cam member 210 to rotate relative to the track wall. This is the case in the embodiments of FIGS. 1-14.

Preferably, the track 270 is a recessed track. In other cases, the track is defined by a surface or edge (e.g., a serpentine or zig-zagged edge) of the track wall. In FIGS. 9a and 9b, the track 270 is a recessed track comprising channels 275 formed in the track wall 265. In more detail, the channels 275 preferably are formed in the perimeter wall portion (or "sidewall") 285 of the track wall 265. The illustrated channels 275 are formed in an outer surface of the track wall. The channels 275 include a plurality of grooves 276 and angled sections that are arranged such that the rotatable cam 210 rotates in the same direction (e.g., clockwise) around the second axis BX each time the caster 10 is adjusted (e.g., moved) between its locked and unlocked configurations.

With continued reference to FIGS. 9a and 9b, the projections 255 of the illustrated rotatable cam 210 are received in the recessed track 270 of the track wall 265. As the rotatable cam 210 rotates about the second axis BX, the projections 255 move within and along the channels 275 of the recessed track 270. Preferably, the recessed track 270 extends continuously around an entire circumference of the track wall 265. Such configurations permit the rotatable cam 210 to rotate repeatedly in a single direction about the second axis BX.

Preferably, certain portions of the channels 275 extend down to (and open through) the bottom end 280 of the track wall 265 such that track openings 290 are defined in the bottom end 280 of the track wall 265. Each track opening 290 is sized to receive a respective projection 255 of the rotatable cam 210. This allows the rotatable cam 210 to be mounted removably to the track wall 265, since the projections 255 can be slid into and out of the recessed track 270 (during assembly and disassembly) via the track openings 290. The illustrated pattern of the recessed track 270 is configured such that the projections 255 remain in the recessed track 270 at all times during operation of the caster 10 and will not inadvertently slide out of the track via the track openings 290.

While embodiments involving a rotatable cam 210 have now been described, other embodiments of the wheel lock assembly 200 do not include a rotatable cam. More will be said of this later.

In some embodiments, the wheel lock assembly 200 includes a resilient lock clip 300. When provided, the resilient lock clip 300 has a deformable, resilient structure that is configured to move repeatedly between a deformed (or expanded) state 305 and an un-deformed (or retracted) state 310. The non-limiting example shown in FIGS. 8a and 8b will now be described. In the deformed (or expanded) state 305, at least a portion of the resilient lock clip 300 is bent or otherwise expanded outwardly (FIG. 8b). In the un-deformed (or retracted) state 310, the resilient lock clip 30 is in a resting and/or retracted position and is not bent outwardly (FIG. 8a) or at least not as much as when in the deformed state. It is to be appreciated that when the resilient lock clip is in the un-deformed (or retracted) state, it may actually just be deformed less (or differently) than when it is in the deformed (or expanded) state.

The resilient lock clip 300 is formed of a durable material having a configuration that provides it with the resiliency to move repeatedly between its deformed (or expanded) 305 and un-deformed (or retracted) 310 states. Preferably, the resilient lock clip 300 comprises a metal, such as hardened spring steel, although other resilient materials can alternatively or additionally be used.

In the embodiments of FIGS. 1-12, when the caster 10 is in the locked configuration 20, the resilient lock clip 300 is in its deformed (or expanded) state 305 so as to engage the wheel 100. This restrains the wheel 100 against rotation about the first axis AX. In embodiments of this nature, the wheel lock assembly 200 can advantageously be configured to provide a moderate locking force for the caster 10. For certain applications, it may be desirable to provide for the resilient lock clip 300 to slip from an initial locked position (so as to thereby allow at least some rotation of the wheel) if enough lateral force is applied to the article to which the caster is mounted. This may reduce the likelihood of the article being tipped over inadvertently when an operator pushes it laterally at a time when the caster is in the locked configuration. This may be beneficial, for example, when the article is a computer stand or a stand for medical equipment.

With continued reference to the embodiments of FIGS. 1-12, when the caster 10 is in the unlocked configuration 30, the resilient lock clip 300 is in its un-deformed (or retracted) state 310 so as to be spaced apart from the wheel 100 (see FIG. 6). This permits the wheel 100 to rotate freely about the first axis AX.

Preferably, the caster 10 is devoid of an external pivotable lever assembly for moving the caster 10 between locked 20 and unlocked 30 configurations. Instead, the wheel lock assembly 200 preferably includes a push button 400, and the caster 10 preferably is configured to move between the locked 20 and unlocked 30 configurations in response to depressing the push button 400. In embodiments where the wheel lock assembly 200 has a push button 400, the push button braking mechanism offers particularly easy access and convenience. When provided, the push button 400 generally has a top wall 415 and a perimeter wall (or "sidewall") 420 coupled to and extending downwardly from the top wall 415. Although the push button 400 is shown having a generally ovular shape, the push button 400 can have any desired shape (e.g., generally rectangular) without departing from the spirit and scope of the present invention.

The illustrated push button 400 is movable between a raised position 405 and a lowered position to lock and unlock the wheel 100. In one preferred configuration, the push button 400 is in its raised position 405 when the caster 10 is in the locked configuration 20, and is in its lowered position when the caster 10 is in the unlocked configuration 30. In other cases, however, the reverse configuration is provided such that the push button 400 is in its raised position 405 when the caster 10 is in the unlocked configuration 30, and is in its lowered position when the caster 10 is in the locked configuration 20.

Pressing the top wall 415 of the push button 400 moves it between its raised 405 and lowered positions. In more detail, each time the illustrated push button 400 is pressed, the caster 10 moves to either the locked configuration or the unlocked configuration. The caster 10 is configured such that when the push button is depressed repeatedly, the caster alternates between its locked configuration and its unlocked configuration. Preferably, the push button 400 is configured to be manually actuated such that a person's foot can press directly on the push button 400 to lock or unlock the wheel 100.

In the preferred configuration described above, when the push button 400 is pressed in order to move it to the raised position, the rotatable cam 210 rotates, so as to force the resilient lock clip 300 into its deformed (or expanded) state 305 and thereby restrain the wheel 100 against rotation about the first axis AX. When the push button 400 is pressed in order to move it to the lowered position 405, the rotatable cam 200 rotates, causing the resilient lock clip 300 to retract inwardly away from the wheel 100 so that the wheel 100 can rotate freely about the first axis AX.

Preferably, it is visually distinguishable whether the push button 400 is in the raised position 405 or the lowered position. For example, a height difference between the raised position 405 and the lowered position may be visually perceptible. Additionally or alternatively, the push button 400 can include indicia to more clearly signal whether the caster 10 is in the locked 20 or unlocked 30 configurations. For instance, the push button 400 can optionally include a pattern, color, or other marking on a lower portion 440 (see FIG. 10d) of the perimeter wall 420. In such cases, the indicia may be absent from an upper portion 445 of the perimeter wall 420, such that when the indicia is exposed (due to the push button 400 being in the raised position 405), it is visually evident whether the caster 10 is in the locked 20 or unlocked 30 configuration. In some cases, the marking indicia is molded into the push button 400. Additionally or alternatively, the indicia can comprise paint (e.g., green paint) or a highly visible coating.

If desired, the caster assembly can be provided with electronic indicia comprising an LED or another light that indicates whether the caster is in the locked or unlocked configuration. A green light may indicate the caster is unlocked. In some cases, the indicia may further include a red light to indicate the caster is locked. Electronic indicia of this nature can optionally be provided for any embodiment of the present disclosure.

The perimeter wall (or "sidewall") 420 of the push button 400 generally has a first end region 425, a second end region 430, and a medial region 435 extending between the first 425 and second 430 end regions. The first 425 and second 430 end regions can optionally have a greater height than the medial region 435, e.g., such that the first 425 and second 430 end regions of the push button 400 extend further from the top wall 415 than does the medial region 435. A configuration of this nature can provide an opening or clearance 450 (see FIG. 10d) in the side wall 420 of the push button 400 located between the first 425 and second 430 end regions thereof. This can provide clearance for rotation of the rotatable cam 210 in certain embodiments where it is disposed within the push button 400.

The present caster 10 can have either a single wheel (see FIG. 14) or two wheels 100 (i.e., a twin wheel design, as shown in FIGS. 1-13). In embodiments having two wheels 100, the wheel lock assembly 200 includes two detents 205. Preferably, the two detents 205 respectively engage the two wheels 100 when the caster 10 is in the locked configuration 20, e.g., such that the two wheels 100 are positively engaged on their respective interior sides 105 by the two respective detents 205 of the wheel lock assembly 200. Configurations of this nature can simultaneously restrain both wheels 100 against rotation about the first axis AX. On the other hand, when the caster 10 is in the unlocked configuration 30, the two detents 205 preferably are spaced apart from the wheels 100 such that both wheels 100 are free to rotate about the first axis AX.

Referring again to FIGS. 8a and 8b, the illustrated lock clip 300 comprises a first section 315 and a second section 320. The first section 315 includes a first end region 325 of the resilient lock clip 300, and the second section 320 includes a second end region 330 of the resilient lock clip 300. A medial region 318 of the illustrated lock clip 300 extends between the first 325 and second 330 end regions. In FIGS. 8a and 8b, the first 315 and second 320 sections are integral parts of a single body. In other cases, the first section and the second section are separate bodies that collectively define the resilient lock clip. In such cases, the medial region 318 may be omitted.

In the embodiments of FIGS. 1-12, the first 325 and second 330 end regions of the illustrated lock clip respectively define two detents 205 of the wheel lock assembly 200. Thus, the first 325 and second 330 end regions of the illustrated lock clip are portions of the wheel lock assembly 200 that are moveable so as to either engage, or be spaced apart from, the two wheels 100. The first 325 and second 330 end regions of the illustrated lock clip 300 define ends that point in generally opposed directions, away from the rotatable cam 210. These details, however, are by no means required.

In the embodiments of FIGS. 1-12, the resilient lock clip 300 moves between its deformed (or expanded) 305 and un-deformed (or retracted) 310 states in response to rotation of the rotatable cam 210. In embodiments of this nature, the rotatable cam 210 (e.g., a lower portion 225 thereof) preferably has at least two cam shoulders 260. Cam shoulders 260 of this nature can advantageously be coupled with the first 325 and second 330 end regions of the resilient lock clip 300, e.g., such that when the caster 10 is in the locked configuration 20, two cam shoulders 260 bear respectively against the first 325 and second 330 end regions of the resilient lock clip 300 and thereby push those end regions of the resilient lock clip against respective interior sides 105 of the two wheels 100. In such cases, force from two cam shoulders 260 causes the resilient lock clip 300 to bend from its un-deformed (or retracted) state 310 to its deformed (or expanded) state 305. Thus, as can be appreciated from FIGS. 8a and 8b, the illustrated rotatable cam member 210 is configured to rotate such that two cam shoulders 260 cam respectively with the first 325 and second 330 end regions of the lock clip 300 and thereby bend the lock clip from its un-deformed state (or retracted) to its deformed (or expanded) state.

On the other hand, when such a caster 10 is in the unlocked configuration 30, the cam shoulders 260 preferably are positioned so that the first 325 and second 330 end regions of the resilient lock clip 300 are spaced apart from the two wheels 100. In this configuration, the cam shoulders 260 preferably are positioned so as not to deform the resilient lock clip 300, or at least not as much as when in the locked configuration. Since pressure from the rotatable cam 210 ceases to be applied (or is at least reduced) to the resilient lock clip 300, the resilient lock clip 300 recovers (e.g., moves resiliently back to) its initial configuration, i.e., it returns to its un-deformed (or retracted) state 310.

In some embodiments of the present disclosure, the caster 10 is a hubless caster. This, however, is not always the case. To the contrary, many of the features disclosed herein (e.g., a rotatable cam member of the nature described above) can be used advantageously on either hubless casters or conventional casters.

In certain embodiments, the caster 10 is a hubless caster that includes two wheels 100, a generally annular central frame member 500, an open central corridor 505, and an optional retention wall 508 (see FIGS. 1 and 4). The generally annular central frame member 500 surrounds the open central corridor 505. The open central corridor 505 is located where a hub would be located on a conventional caster. The open central corridor 505 is centered on the first axis AX. As shown in FIGS. 1-12, on the first axis AX of a hubless caster 10, there may be no solid material, instead there may be just open space. If desired, the rotatable cam 210 can be centered on the second axis BX, and the second axis BX can be parallel to a radial axis of the wheels 100 (see FIG. 2).

In embodiments where the caster 10 is hubless, it can optionally include two generally annular mount portions 514 respectively located on opposite sides 520, 525 of the generally annular central frame member 500. Reference is made to FIG. 4. When provided, the two generally annular mount portions 514 respectively receive two wheels 100 when the wheels 100 are mounted on the generally annular central frame member 500. Each wheel 100 can be part of a wheel/bearing assembly, e.g., of the nature described in U.S. Patent Application Publication No. 2016/0107481, the salient teachings of which are incorporated herein by reference.

Preferably, the caster 10 is a swivelable caster configured to swivel about a third axis CX (see FIG. 2). In such cases, the caster 10 includes a caster stem (or vertical pin) 50. In hubless caster embodiments, the caster stem 50 preferably is attached to the generally annular central frame member 500. The caster stem 50 defines the axis CX about which the caster 10 is configured to swivel. The caster stem 50 can be attached removably to a leg of a chair or a base of another article so as to permit swivel movement of the caster 10 about the third axis CX. An optional friction sleeve 60 can be coupled to the caster stem 50. Alternatively, the friction sleeve 60 can be replaced with a conventional metal friction ring.

In preferred embodiments, the caster 10 is devoid of a swivel lock mechanism. In such cases, neither the wheel lock assembly 200, nor any other locking mechanism on the caster, is configured to prevent (e.g., lock against) rotational movement of the caster 10 about the third axis CX.

In hubless caster embodiments, the generally annular central frame member 500 has a radially-outward-facing base surface 510 and a radially-inward-facing surface 530. The radially-inward-facing surface 530 faces toward the open central corridor 505 and thus is opposed to the radially-outward-facing base surface 510. Preferably, the wheel lock assembly 200 is located radially outward of the radially-outward-facing base surface 510.

Referring now to FIG. 11, the illustrated central frame member 500 has a carve-out recess 535 formed therein, such that a lock-assembly compartment 540 is provided by the carve-out recess 535. When provided, the carve-out recess 535 can optionally be formed when the generally annular central frame member 500 is molded into its desired shape (thus the carve-out recess will not normally be made by any carving process). The illustrated lock-assembly compartment 540 is bounded radially inwardly by the radially-outward-facing base surface 510 of the generally annular central frame member 500.

With reference to FIGS. 1, 3, 4, and 6, it can be appreciated that the present hubless caster embodiments can optionally include a wrap-around cover 600. The optional wrap-around cover 600, when operatively assembled on the caster, preferably is configured to enclose the carve-out recess 535. The illustrated wrap-around cover 600 has an opening 605 formed therein configured such that the push button 400 extends there through when the caster is operatively assembled. When the wrap-around cover 600 is positioned over the carve-out recess 535, it preferably encloses all portions of the wheel lock assembly 200, except the push button 400 and portions of the detent(s) 205 that engage the wheel(s) 100. Since the push button 400 extends through the opening 605 in the wrap-around cover 600, the push button 400 is exposed so as to be manually actuatable. As shown in FIG. 4, the wrap-around cover 600 can optionally include tabs 610 for securing it to the generally annular central frame member 500.

Referring again to FIG. 11, it can be appreciated that the lock-assembly compartment 540 preferably is located between the two wheels 100 and bounded radially outwardly by the wrap-around cover 600 and the push button 400. In such cases, the carve-out recess 535 is located beneath both the wrap-around cover 600 and the push button 400. Thus, the wheel lock assembly 200 can optionally be disposed within the push button 400 and located entirely radially outward of the radially-outward-facing base surface 510 of the generally annular central frame member 500.

In hubless caster embodiments involving a resilient lock clip 300 of the nature described above, it can be mounted on the generally annular central frame member 500. For example, the central frame member 500 can have a mounting structure comprising a plurality of pins 516 spaced apart from one another such that a medial region 318 of the resilient lock clip 300 is positioned (and retained) therebetween (see FIG. 5). Instead of the pins 516 shown in FIG. 5, spaced apart shoulders or the like can be used to mount the resilient lock clip 300 on the generally annular central frame member 500.

Figure 5:
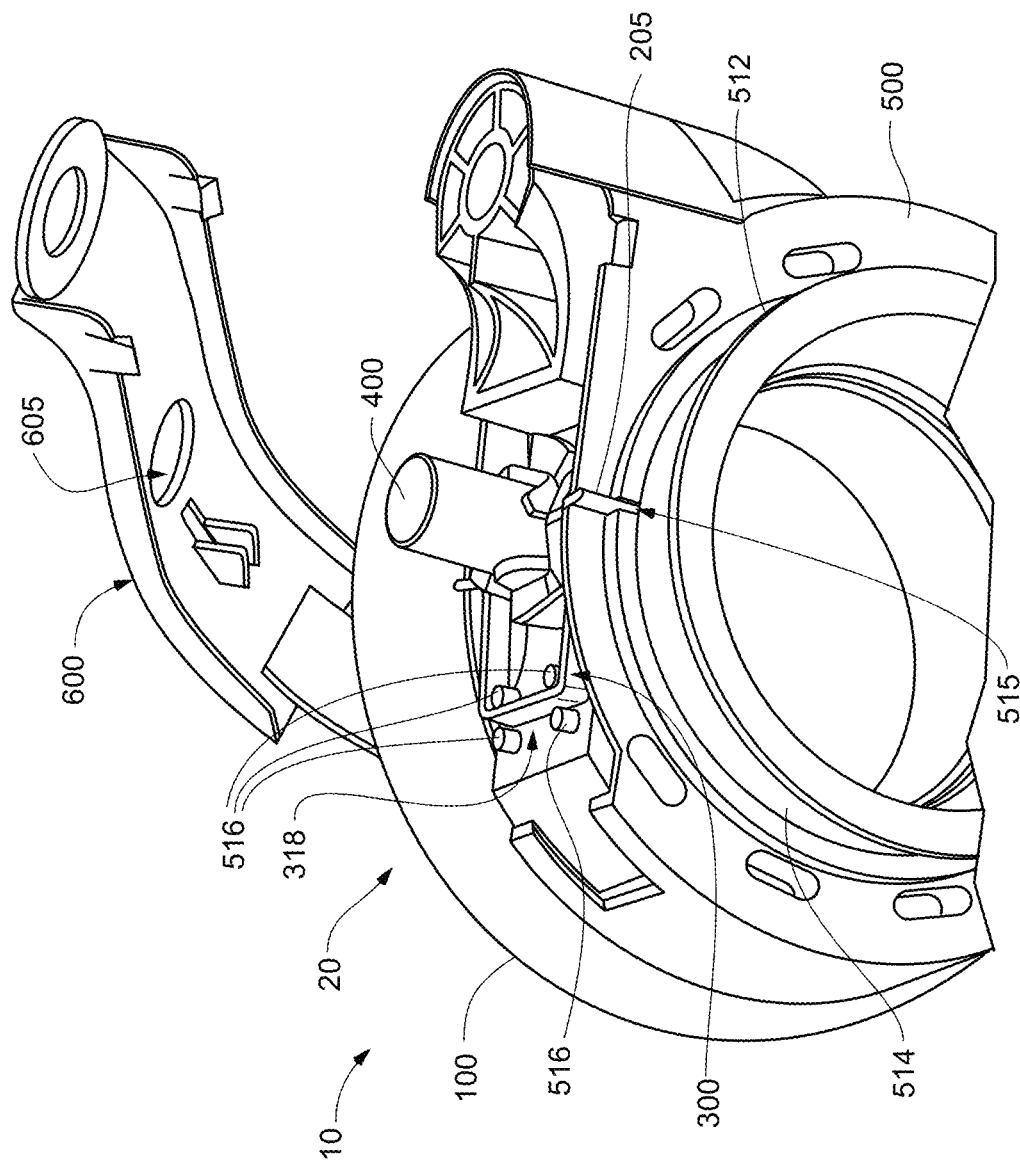
FIG. 5 is a broken-away perspective view of an alternate embodiment of a hubless caster shown in a locked configuration such that two end regions of a resilient lock clip are bent outwardly by a rotatable cam to engage the wheels, with one of the wheels removed for clarity.
Figure 10C:
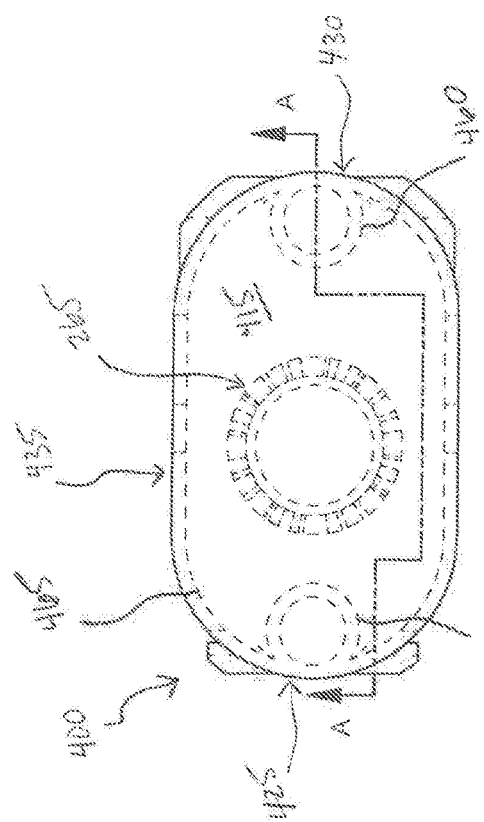
FIG. 10c is a top view of the push button of the hubless caster of FIG. 1.
Figure 40D:
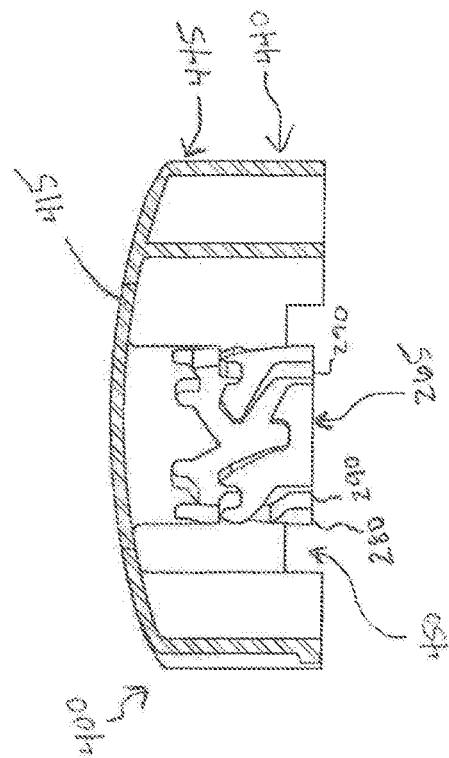
Figure 10A:
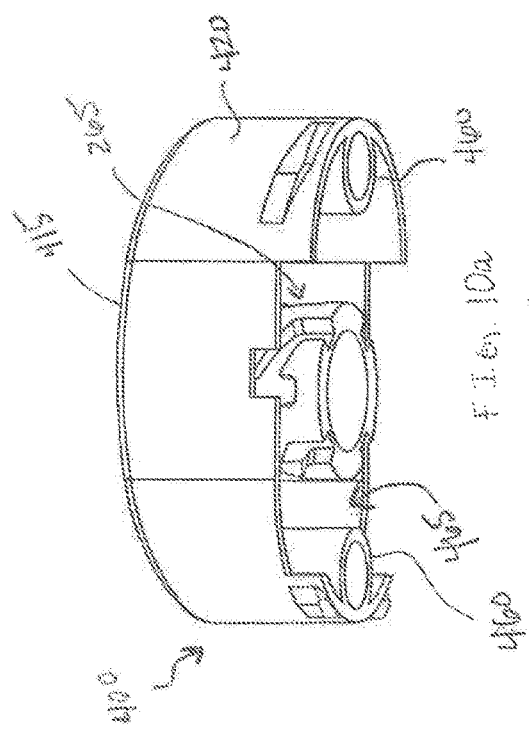
FIG. 10a is a bottom perspective view of the push button of the hubless caster of FIG. 1.
Figure 10B:
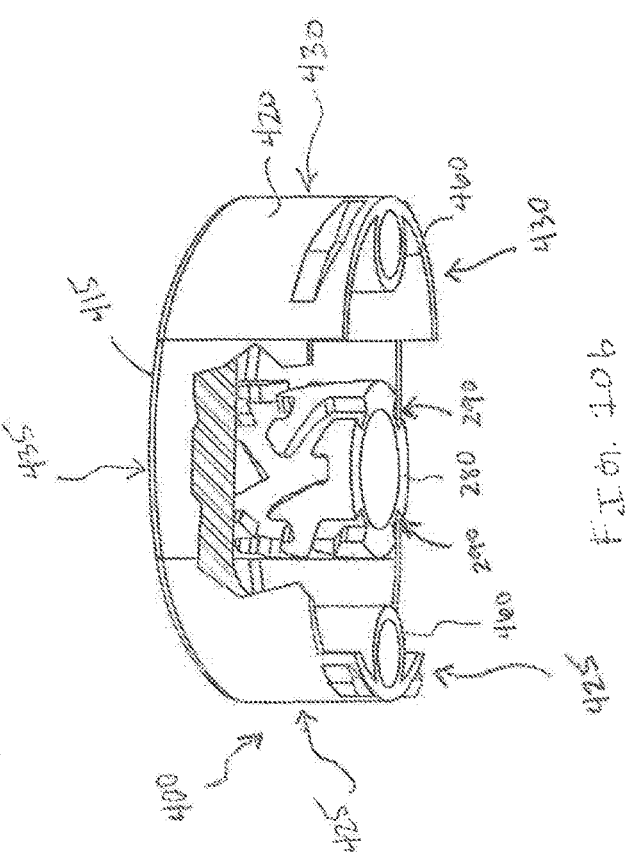
FIG. 10b is a broken-away bottom perspective view of the push button of FIG. 1, with a portion of the push button broken away to show a recessed track of the track wall.
Figure 13:
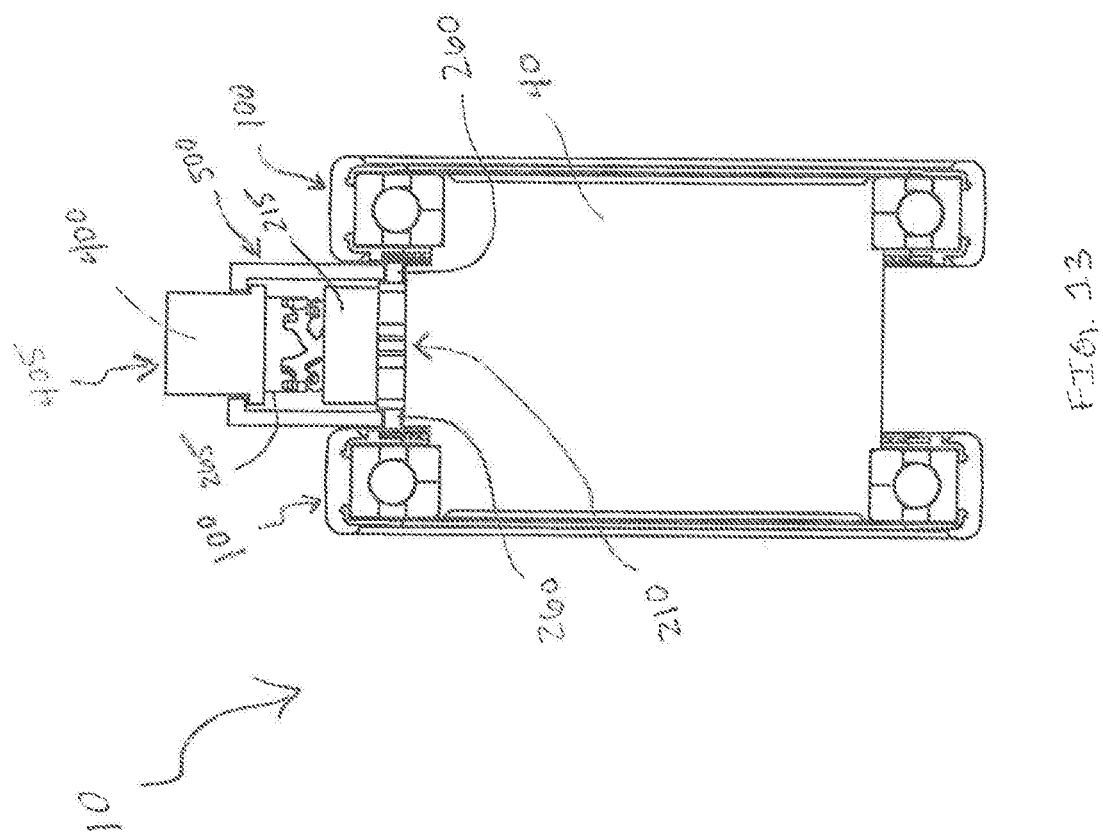
FIG. 13 is a schematic cross-sectional view of another embodiment of a caster having a wheel lock assembly that includes a rotatable cam.
Figure 14:
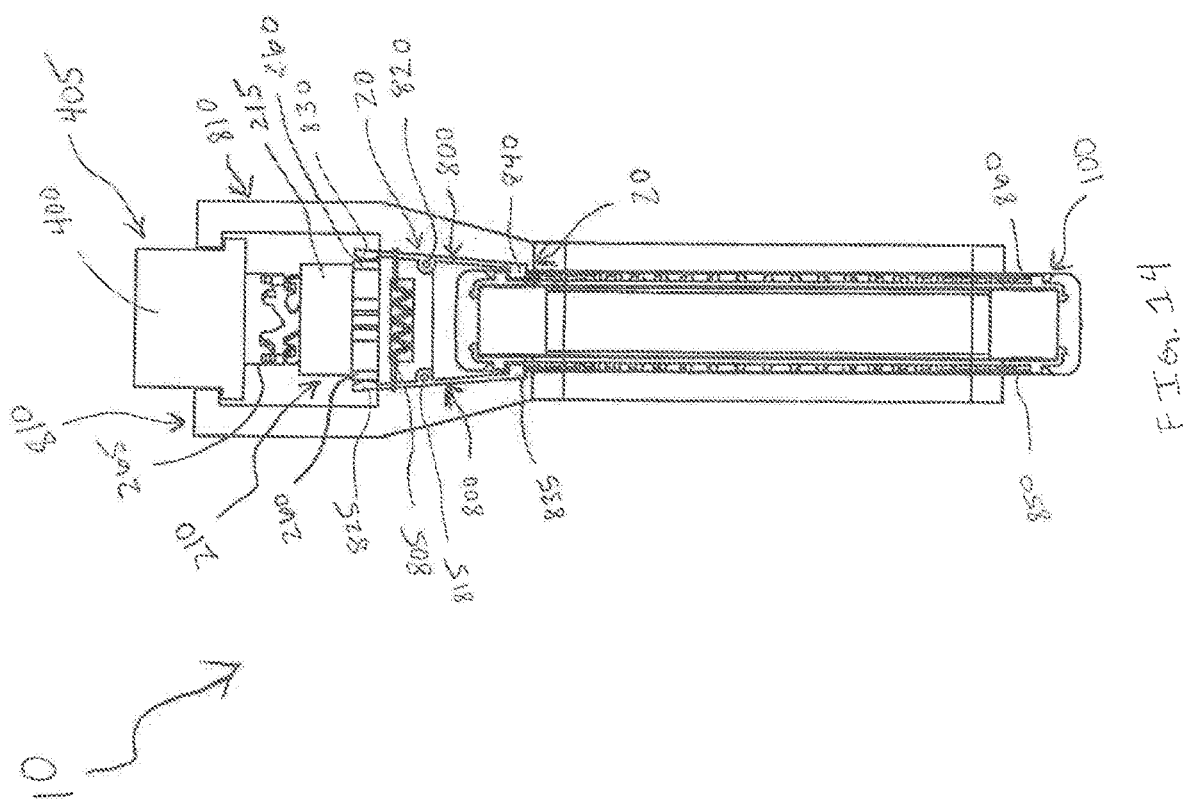
FIG. 14 is a cross-sectional view of a single wheel caster having a wheel lock assembly that includes a rotatable cam in accordance with still another embodiment of the invention.

In FIGS. 5 and 6, the generally annular central frame member 500 has a pair of detent openings 515. The detent openings 515 are located on opposite sides 520, 525 of the generally annular central frame member 500 and are configured to allow two detents 205 of the illustrated wheel lock assembly 200 to extend respectively there through for engaging the two respective wheels 100. In more detail, the illustrated detent openings 515 are configured to permit first 325 and second 330 end regions of a resilient lock clip 300 to extend there through so as to engage recesses formed on interior sides of the two wheels.

Thus, in certain embodiments, the wheel lock assembly 200 is a cam-spring-follower lock assembly 700 that includes the rotatable cam 210, a spring 705 (see FIG. 4), and two detents 205. In embodiments of this nature, the cam-spring-follower lock assembly 700 preferably is located entirely radially outward of a radially-outward-facing base surface 510 of a generally annular central frame member 500.

In some cases, the caster 10 includes a cam-spring-follower lock assembly 700 that is located directly between two wheels 100 of the caster such that when the caster is in the locked configuration 20, the two wheels 100 are positively engaged on their respective interior sides 105 by two respective detents 205 of the cam-spring-follower lock assembly 700. Configurations of this nature can restrain both wheels 100 against rotation about the first axis AX. On the other hand, when such a caster 10 is in the unlocked configuration 30, the two detents 205 of the cam-spring-follower lock assembly 700 are spaced apart from the two wheels 100 such that both wheels 100 are free to rotate about the first axis AX.

Preferably, the spring 705 of such a cam-spring-follower lock assembly 700 biases the push button 400 toward a raised position 405. In the embodiment of FIGS. 1-12, the spring 705 biases the push button 400 away from the generally annular central frame member 500. Thus, each time the push button 400 is depressed, the rotatable cam 210 rotates, causing the caster 10 to move between its locked 20 and unlocked 30 configurations.

Referring to FIGS. 9*a* and 9*b*, the grooves 276 in the recessed track 270 define a series of pockets 278. As the rotatable cam 210 rotates about the second axis BX, the projections 255 of the rotatable cam 210 travel within the channels 275. In more detail, each projection 255 moves from one pocket 278 to the next in response to each depression of the push button 400. The projections 255 are aligned with one another on the rotatable cam 210 such that, during rotation of the cam 210, all of the projections 255 simultaneously move into respective pockets 278. Due to the action of the spring 705, the projections 255 are retained within respective pockets 278 when the caster is in the locked 20 and unlocked 30 configurations.

In some embodiments, the push button 400 includes two guide-post receivers 460 that respectively comprise two generally cylindrical walls. Reference is made to FIGS. 10*a*-10*d*. Here, each illustrated guide-post receiver 460 projects radially inwardly from the interior wall 465 of the push button 400. In hubless caster embodiments of this nature, two corresponding guide posts 560 project radially outwardly from the radially-outward-facing base surface 510 of the generally annular central frame member 500 (FIG. 11). In such cases, the guide posts 560 are slidably received respectively in the guide-post receivers 460 to mount the push button 400 to the generally annular central frame member 500.

In certain embodiments, the track wall 265 is disposed inside the push button 400 and is located between two guide-post receivers 560 of the nature described above. In embodiments that include a central guide post 560, it preferably is located between two outer guide posts 460 such that the track wall 265 is slidably received on the third guide post 560.

In various embodiments of the present disclosure, the wheel lock assembly 200 comprises two fingers 206. In embodiments of this nature, the fingers 206 are the detents 205 of the wheel lock assembly 200. Preferably, such fingers 206 both project along an axis that is at least substantially parallel to the first axis AX. In dual-finger embodiments, when the caster 10 is in the locked configuration 20, the two wheels 100 are positively engaged respectively on their interior sides 105 by the two fingers 206, such that the two wheels 100 are restrained against rotation about the first axis AX. When such a caster 10 is in the unlocked configuration 30, the two fingers 206 are spaced apart from the two wheels 100, such that the two wheels 100 are free to rotate about the first axis AX. In some cases, the two fingers 206 are configured to move axially toward and away from the respective interior sides 105 of the two wheels 100 in response to rotation of the rotatable cam 210. This, however, is not the case in all dual-finger embodiments. In certain embodiments, the two fingers 206 are integral portions of a resilient lock clip 300, optionally of the type described above.

The caster 10 of the present disclosure preferably is configured such that when it is in the locked configuration 20, there is no contact between a tread surface of any wheel 100 of the caster and any brake member (e.g., detents 205) of the wheel lock assembly 200.

In certain embodiments, the caster 10 has only a single wheel 100. Reference is made to the non-limiting design shown in FIG. 14. Here, the illustrated caster 10 has a pair of pivotable arms 800. The two pivotable arms 800 have a spring 805 positioned therebetween. The spring 805 shown in FIG. 14 expands and retracts in response to rotation of the rotatable cam 210. The two pivotable arms 800 are attached to a frame member 810 at respective pivot points 815 and 820. When two cam shoulders 260 of the rotatable cam 210 bear against first end regions 825, 830 of the respective two pivotable arms 800, those arms pivot around their respective pivot points 815, 820, such that second end regions 835, 840 of the two respective pivotable arms 800 engage respective recesses on exterior faces 850, 860 of the single wheel 100, thereby locking the wheel 100 against rotation. When the cam shoulders 260 of the rotatable cam 210 do not bear against the first end regions 825, 830 of the two pivotable arms 800, the spring 805 retracts inwardly and causes the two pivotable arms 800 to pivot about their respective pivot points 815, 820, such that the second end regions 835, 840 of the two pivoting arms 800 are spaced apart from the wheel 100, thereby allowing free rotation of the wheel 100.

FIGS. 15-21b show a further embodiment of a caster 10 that includes a wheel 100 and a wheel lock assembly 200. The wheel 100 is configured to rotate about a first axis AX, and the wheel lock assembly 200 is configured to lock the wheel against rotation about the first axis. In the present embodiment, the wheel lock assembly 200 includes a rotatable track wall 965 (see FIG. 16). The rotatable track wall 965 comprises (e.g., is) a generally cylindrical wall configured to rotate about a second axis DX. In the present embodiment, the shape of the track wall 965 can optionally be the same as that of track wall 265, which was described previously.

Figure 16:
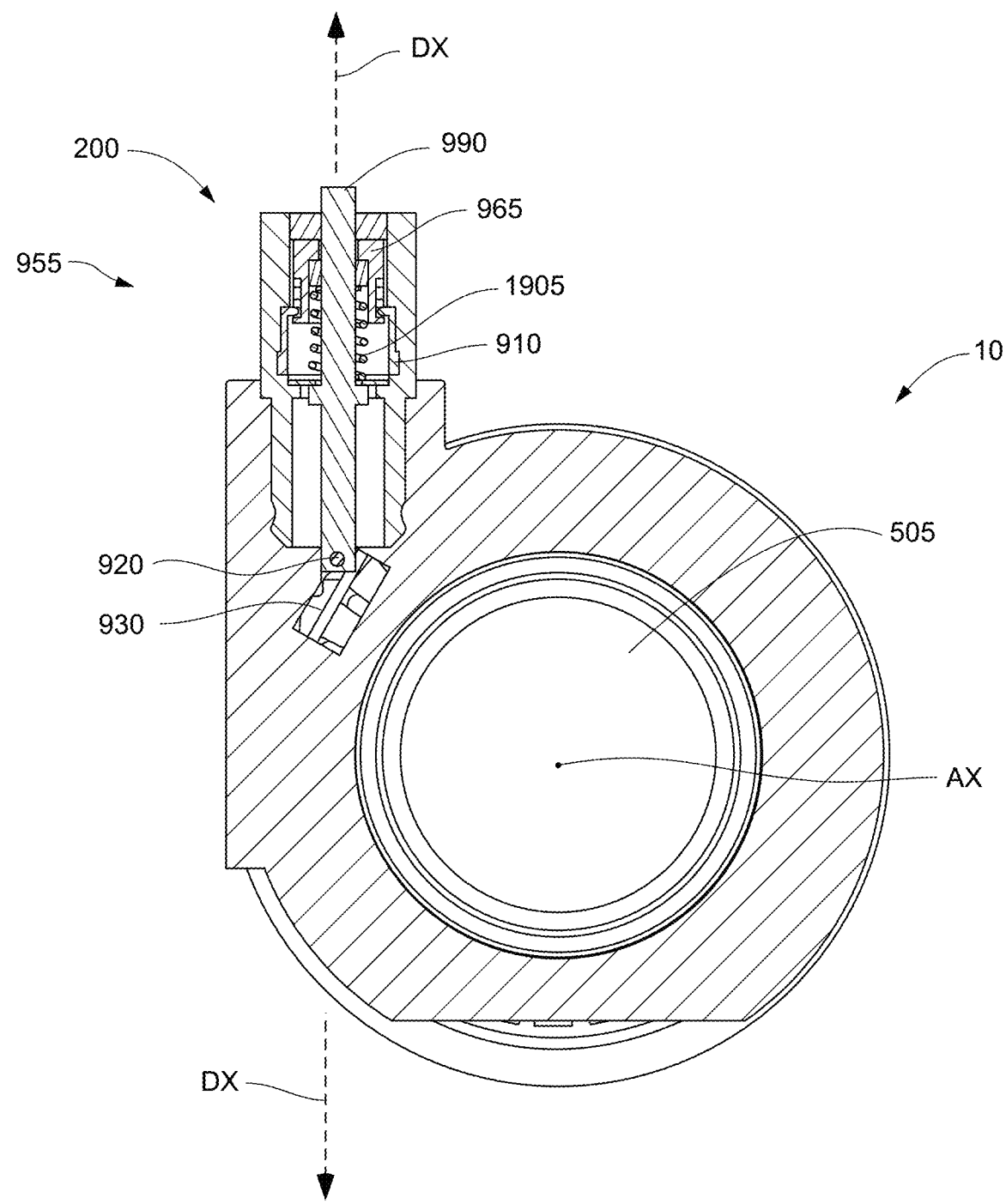
FIG. 16 is a schematic cross-sectional view of the hubless caster of FIG. 15.

Preferably, the first AX and second DX axes are orthogonal to each other, as is perhaps best shown in FIG. 16. Additionally or alternatively, the second axis DX can optionally have a generally tangential orientation relative to the wheel 100 of the present caster. This too is shown in FIG. 16.

In the present embodiment, the illustrated wheel lock assembly 200 is illustrated as being part of a column 955 (optionally having a generally cylindrical configuration) that projects generally away from the wheel 100 so as to be disposed in a generally tangential orientation relative to the wheel. This, however, is not required. Rather, a wheel lock assembly 200 having a rotatable track wall 965 can be embodied in many other configurations.

The illustrated column 955 has a generally cylindrical configuration. However, it can alternatively have a generally block-like and/or cuboidal shape, optionally having a generally square or rectangular cross-section.

Figure 15:
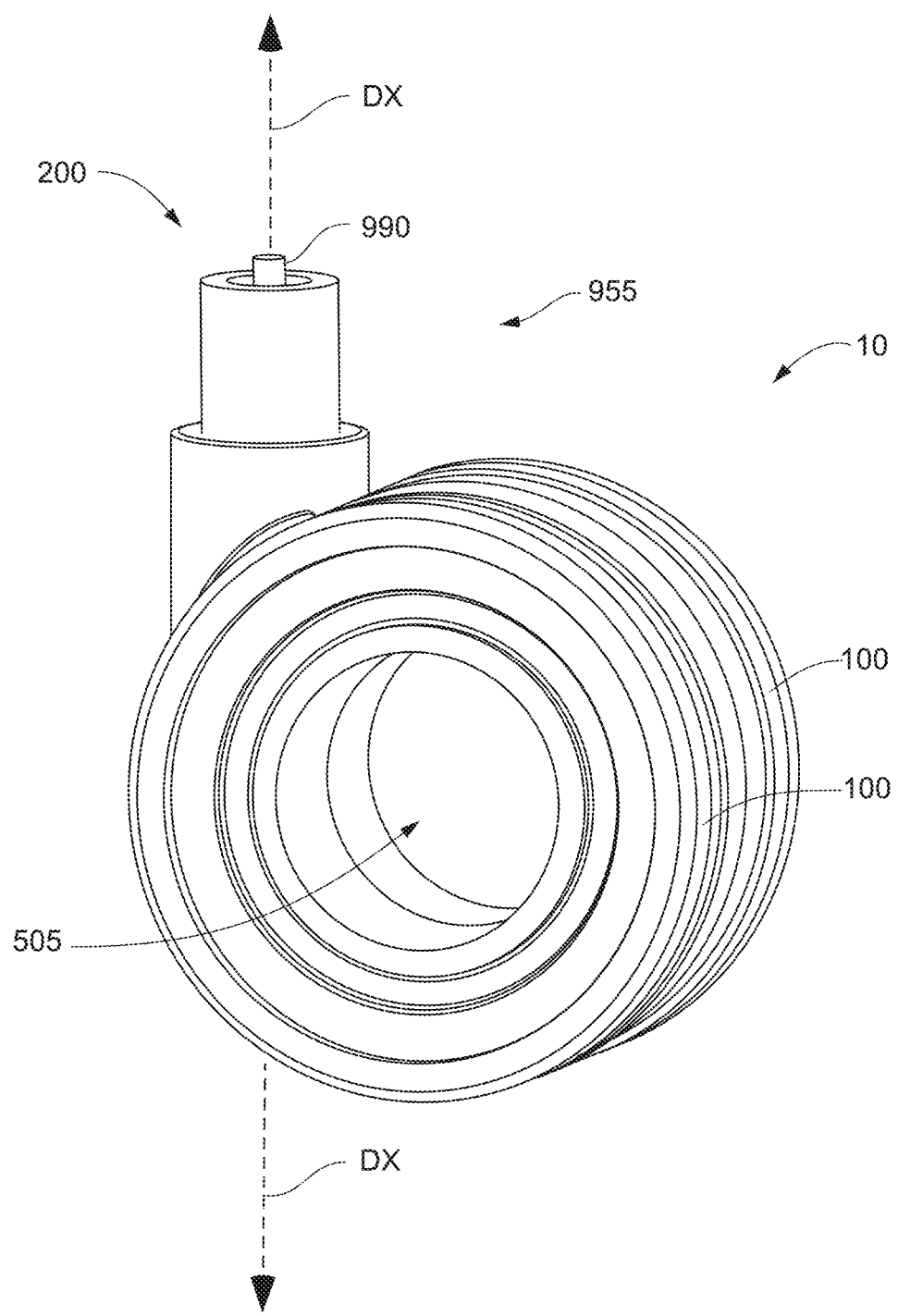
FIG. 15 is a side perspective view of a hubless caster in accordance with another embodiment of the present disclosure.

In embodiments where the column 955 has a generally cylindrical configuration, it can optionally have a generally circular cross-section. In some cases, the column 955 can have both an upper portion and a lower portion, where such portions have different outer diameters. Referring to FIG. 15, for example, the column 955 has a lower portion (located closer to the wheel than is the upper portion) with a larger outer diameter than the upper portion. These details, however, are by no means limiting.

In the present embodiment, the track wall 965 preferably is disposed within a column 955 of the caster. Reference is made to FIG. 16.

Figure 17:
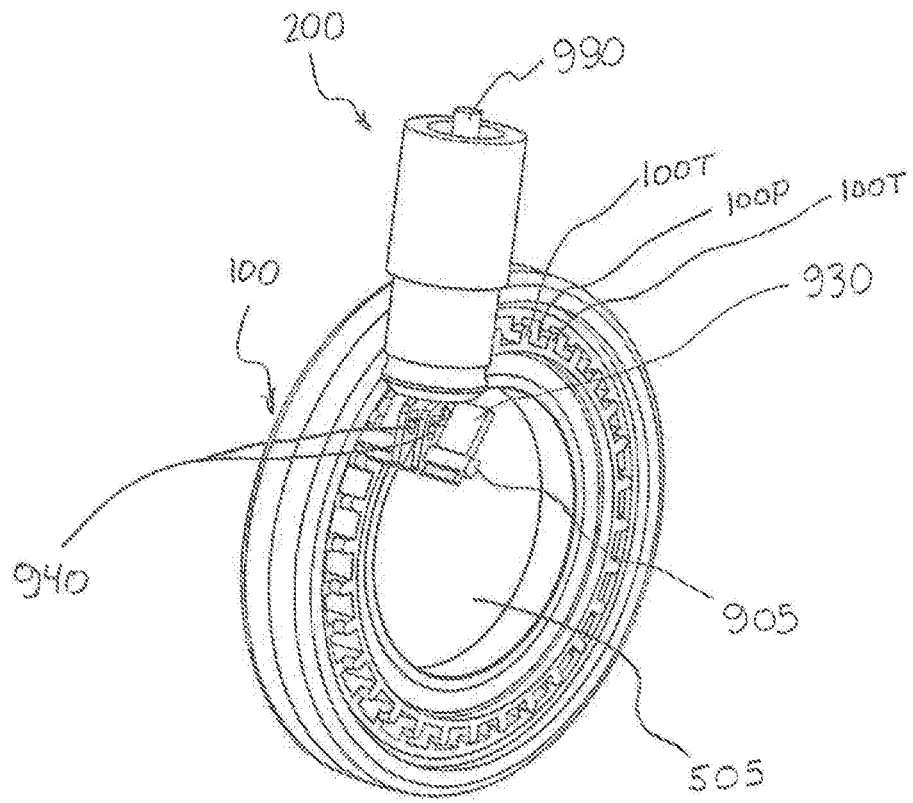
FIG. 17 is a perspective detail view of one wheel and a portion of a wheel locking assembly of the hubless caster of FIG. 15, with the wheel locking assembly unlocked.
Figure 18:
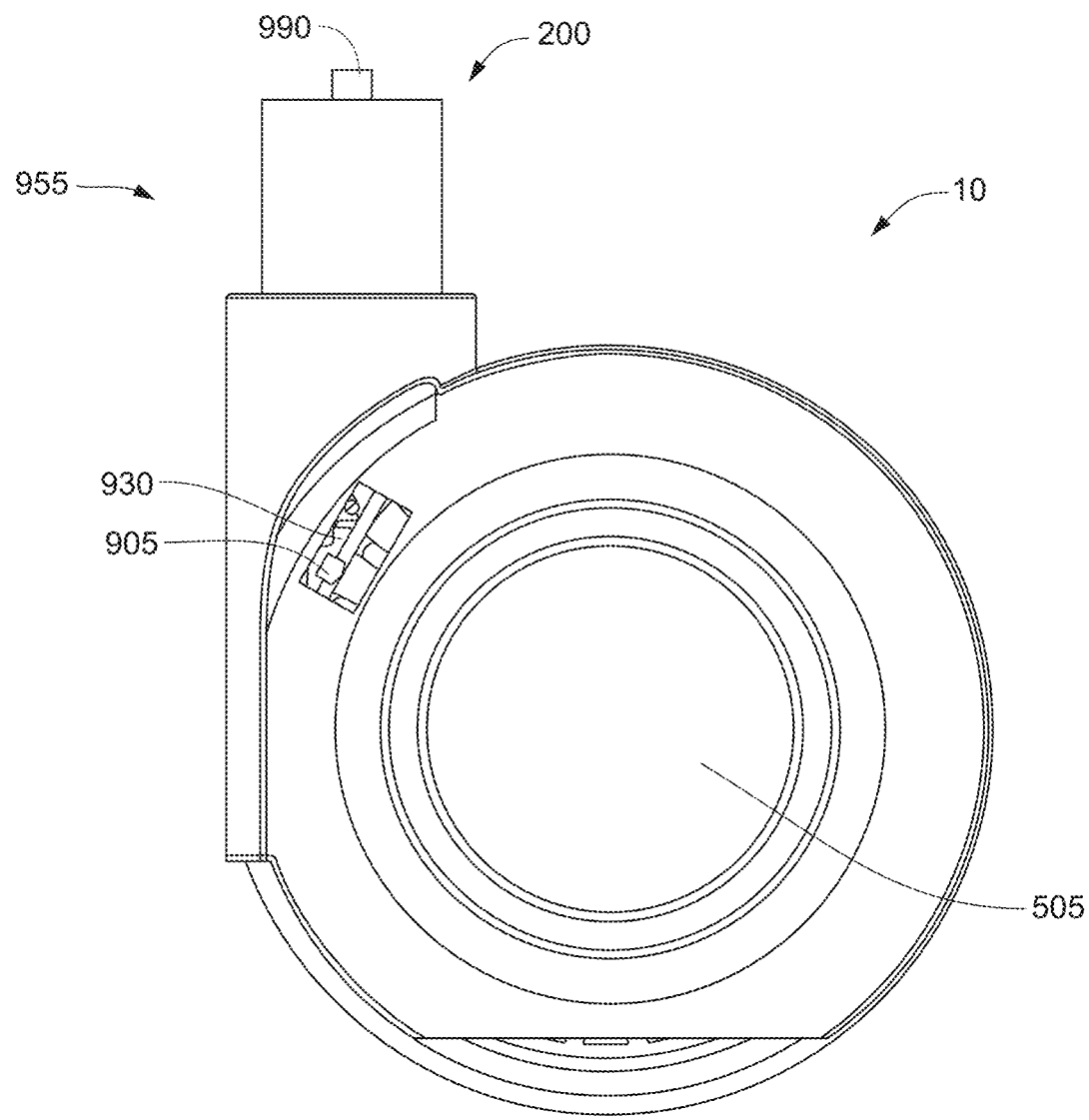
FIG. 18 is a side view of the hubless caster of FIG. 15 with a portion of the caster shown as transparent to illustrate details of the wheel locking assembly, and with the wheel locking assembly unlocked.

With continued reference to FIGS. 15-21b, it can be appreciated that the present caster 10 has a locked configuration (see FIGS. 19 and 20) and an unlocked configuration (see FIGS. 17 and 18). When the caster 10 is in the locked configuration, the wheel 100 is positively engaged by a detent 905 of the wheel lock assembly 200, such that the wheel is restrained against rotation about the first axis AX. When the caster 10 is in the unlocked configuration, the detent 905 of the wheel lock assembly 200 is spaced apart from the wheel 100 such that the wheel is free to rotate about the first axis AX.

In the present embodiment, the rotatable track wall 965 is mounted so as to be rotatable about the second axis DX. In more detail, the caster 10 is configured such that the rotatable track wall 965 rotates about the second axis DX when the caster is adjusted (e.g., moves) between its locked and unlocked configurations. In this embodiment, the caster 10 preferably is configured such that the rotatable track wall 965 simultaneously moves axially along, and rotates about, the second axis DX when the caster is adjusted (e.g., moves) between its locked and unlocked configurations. In the present embodiment, the track wall 965 preferably is disposed within a column 955 of the caster. Reference is made to FIG. 16. Here, the rotatable track wall 965 preferably is mounted for simultaneous rotation about, and axial movement along, the second axis DX. This movement of the track wall 965 preferably is within a column 955 of the caster.

As noted above, the illustrated wheel lock assembly 200 includes a column 955 (e.g., comprising a tube or other housing) that projects generally away from the wheel 100, optionally so as to be disposed in a generally tangential orientation relative to the wheel. This column can be referred to herein as a "wheel lock column." At a distal end (i.e., the end furthest from the wheel) of the wheel lock column 955, the illustrated wheel lock assembly 200 preferably has a push button configured for manual actuation so as to depress the push button and thereby adjust the caster between its locked and unlocked configurations. More will be said of this later.

In the present embodiment, the wheel lock assembly 200 preferably includes a cam member 910 (see FIG. 16). When provided, the cam member 910 is mounted adjacent (e.g., so as to be operatively coupled with) the rotatable track wall 965. Preferably, the cam member 910 comprises a generally cylindrical wall. In the embodiment of FIGS. 15-21b, the rotatable track wall 965 and the generally cylindrical wall of the cam member 910 are nested one inside the other.

The illustrated cam member 910 is a discrete body mounted in a fixed position as a removable part. In other cases, the cam member can be integral to a housing of the wheel lock column 955, integral to a projection of a central frame member of the caster, or integral to another body relative to which the track wall 965 is configured to rotate.

In FIGS. 15-21b, the illustrated cam member 910 is mounted in an axially-fixed location so as to be restrained against moving axially along the second axis DX when the caster 10 is adjusted (e.g., moves) between its locked and unlocked configurations. Preferably, the rotatable track wall 965 and the generally cylindrical wall of the cam member 910 form a subassembly in which the track wall is rotatable about the second axis DX relative to the generally cylindrical wall of the cam member, which preferably is maintained in a stationary position relative to (and thus is not rotatable about) the second axis.

The rotatable track wall 965 has a track. The track is configured such that when the track wall 965 moves axially along the second axis DX, the track rides along one or more projections (such as pins) or areas and/or surfaces of the cam member, thereby causing the track wall to simultaneously rotate about the second axis. Preferably, the rotatable track wall 965 has a track that is recessed. In other cases, the track can be defined by a surface or edge (e.g., a serpentine or zig-zagged edge) of the track wall. In cases where the track is a recessed track, the cam member 910 preferably has at least two projections received in the recessed track. If desired, the cam member 910 can have only two projections that project radially inwardly from diametrically-opposed locations on the cam member. More preferably, though, the cam member 910 has three or more (e.g., four) circumferentially spaced-apart projections (e.g., posts) that project radially inwardly from the cam member. As noted above, the track wall 965 in the present embodiment can optionally have the same shape as track wall 265, which was described previously.

In the present embodiment, the wheel lock assembly 200 preferably includes a drive shaft 990. When provided, the drive shaft 990 is configured to move axially (e.g., along the second axis DX) when the caster 10 is adjusted (e.g., moves) between its locked and unlocked configurations. Preferably, the drive shaft 990 is configured such that it does not rotate (e.g., about the second axis DX) when it moves axially. The illustrated drive shaft 990 is elongated and has its length (i.e., its major dimension) extending along the second axis DX.

The drive shaft 990 can optionally have a generally tangential orientation relative to the wheel 100 of the present caster 10. This is perhaps best shown in FIG. 16. The drive shaft 990 can optionally be a single body. In other cases, the drive shaft can be formed by two or more shaft sections connected (e.g., threaded) together. The drive shaft 990 preferably is formed of metal. In other cases, though, it is formed of ceramic, polymer, or a composite.

In the present embodiment, the caster 10 preferably includes a biasing means (e.g., a spring) 1905 for biasing the drive shaft 900 toward a default position. As shown in FIG. 16, the illustrated biasing means 1905 can optionally be a coil spring mounted around the drive shaft 990. The biasing means 1905 is positioned to bias (e.g., push upwardly on) the rotatable track member 965 upwardly (i.e., away from the wheel). The illustrated track member 965 is operably coupled to the drive shaft 900 such that the track member is free to rotate relative to the drive shaft but moves axially together with the drive shaft.

In FIGS. 15-21b, the wheel lock column 955 has an interior recess (e.g., an interior bore) in which the drive shaft 990 is mounted so as to be slidable or otherwise movable axially between first and second positions. Preferably, the caster 10 is configured such that when the drive shaft 990 is in the first position (see FIGS. 17 and 18), the caster is in its unlocked configuration, whereas when the drive shaft is in the second position, the caster is in its locked configuration (see FIGS. 19 and 20).

In some cases, the wheel lock assembly 200 includes a wedge 930 coupled to the drive shaft 990 (e.g., coupled to an end thereof), and the wedge defines the detent(s) 905 of the wheel lock assembly. This is perhaps best shown in FIGS. 17 and 19. Here, the illustrated wedge 930 is coupled to the drive shaft 990 by a pin (e.g., a roll pin) 920, which is shown coupled to the drive shaft 990 in a cross-wise manner. In more detail, the illustrated wedge 930 defines a slot 940 in which the pin 920 is received. When provided, the slot 940 preferably extends along a path that includes at least one curve or angled turn. The non-limiting configuration of the illustrated slot 940 is perhaps best shown in FIG. 21b.

As noted above, the present wheel lock assembly 200 can optionally include a push button. When provided, the push button preferably is exposed so as to be manually operable, i.e., by an operator depressing the push button so as to adjust the caster between its locked and unlocked configurations. In some cases, the push button can be located at one end of the drive shaft 990, whereas the wedge 930 is located at an opposite end of the drive shaft. If desired, the top end of the drive shaft 990 itself can serve as the push button. Alternatively, a separate push button can be coupled with (e.g., mounted over) a distal end of the drive shaft.

In view of the foregoing descriptions, it can be appreciated that the wheel lock assembly 200 can include a cam member 910 comprising a generally cylindrical wall, the generally cylindrical wall of the cam member 910 and a rotatable track wall 965 can be nested one inside the other, and a drive shaft 990 can be nested inside both the rotatable track wall 965 and the generally cylindrical wall of the cam member 910. For example, the rotatable track wall 965 (which may have a smaller outer radius than does the generally cylindrical wall of the cam member) can be nested inside the generally cylindrical wall of the cam member 910, and the drive shaft 990 can be nested inside the rotatable track wall.

Figure 19:
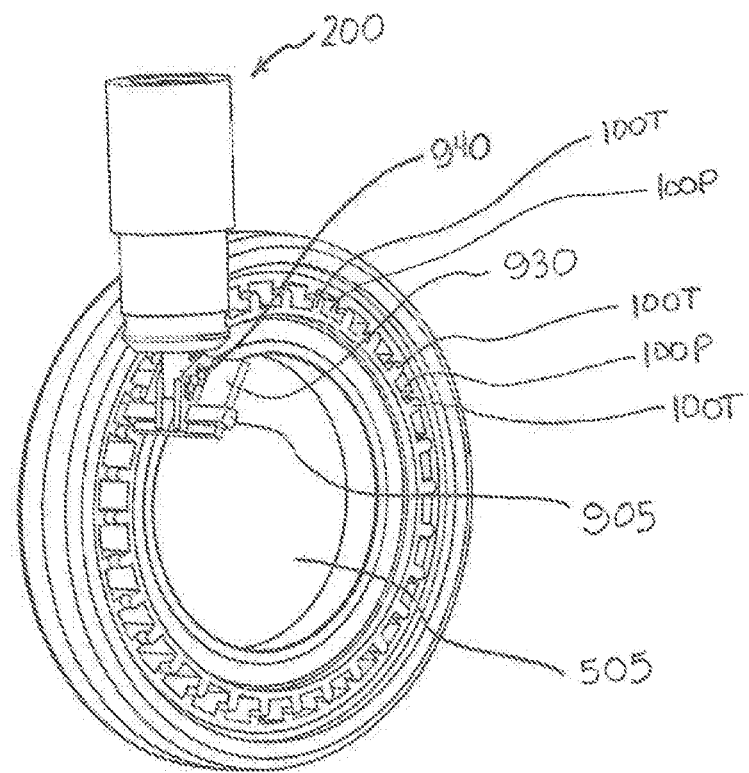
FIG. 19 is a perspective detail view of one wheel and a portion of a wheel locking assembly of the hubless caster of FIG. 15, with the wheel locking assembly locked.
Figure 20:
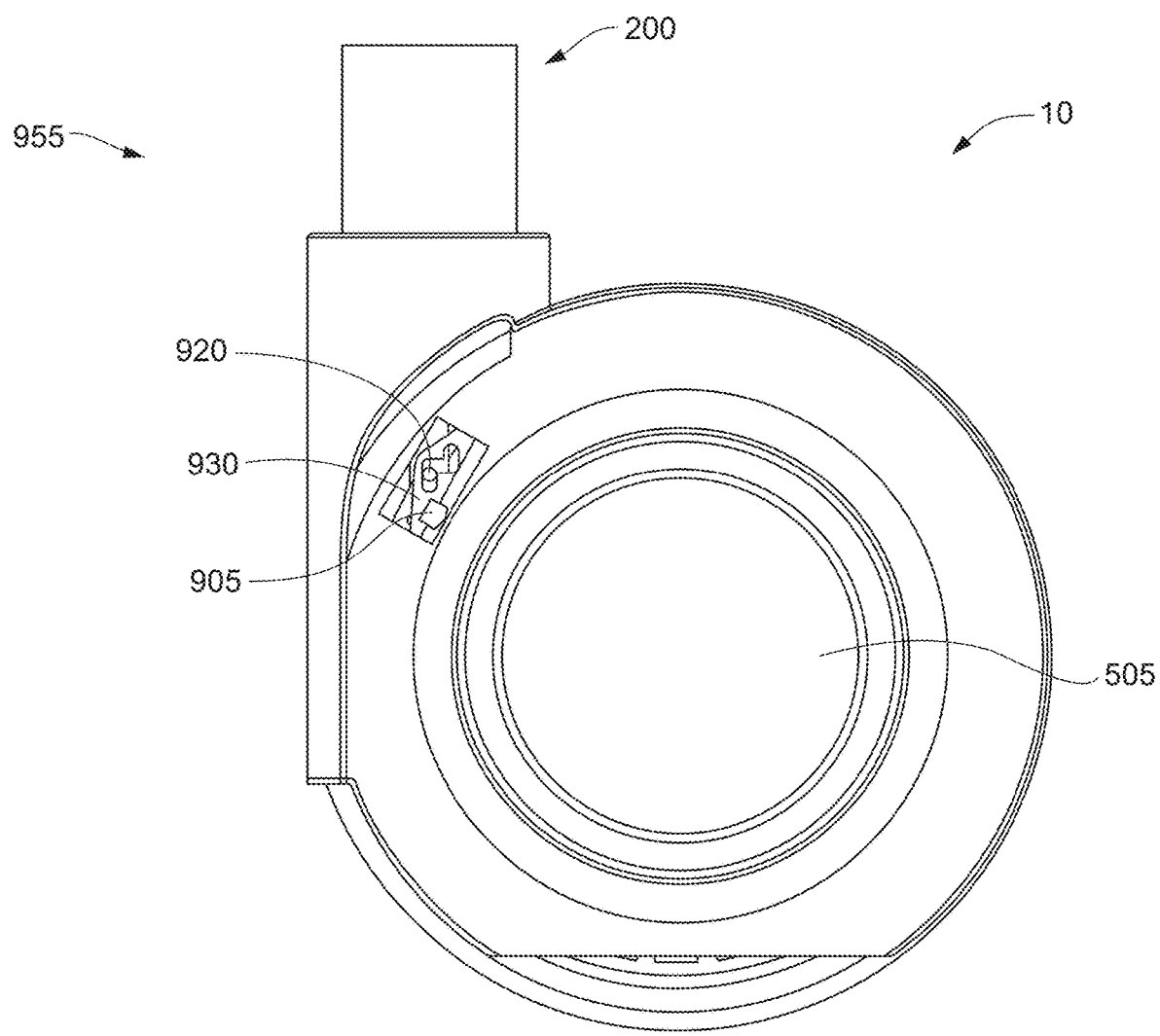
FIG. 20 is a side view of the hubless caster of FIG. 15 with a portion of the caster shown as transparent to illustrate details of the wheel locking assembly, and with the wheel locking assembly locked.
Figure 22:
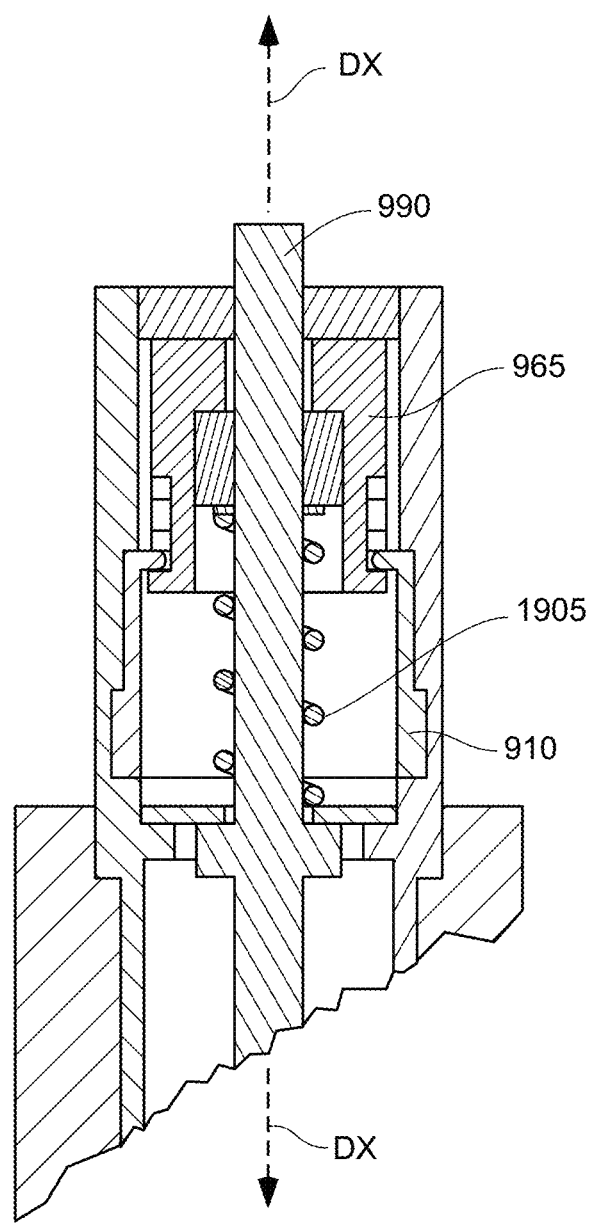
FIG. 22 is a schematic detail view of wheel lock assembly components of FIG. 16.

In some cases, the present caster 10 has two wheels 100 each configured to rotate about the first axis AX, such that the wheel lock assembly 200 is configured to lock both wheels 100 against rotation about the first axis AX. In such cases, the wheel lock assembly 200 preferably includes two detents (or two portions of a detent) 905 each positioned adjacent a respective one of the two wheels 100. When such a caster 10 is in the locked configuration, the two wheels 100 preferably are engaged positively on respective interior sides by the two respective detents (or by two portions of a detent) 905 of the wheel lock assembly 200, such that the two wheels are restrained against rotation about the first axis AX. When such a caster 10 is in the unlocked configuration, the two detents (or two portions of a detent) 905 of the wheel lock assembly 200 preferably are spaced apart from the two wheels such that the two wheels are free to rotate about the first axis AX. In cases where the present wheel lock assembly 200 includes a wedge 930, the wedge can optionally define both of the two detents (or both portions of a detent) 905. This is shown in FIGS. 17, 19, and 21b.

In the present embodiment, the interior sides of the two wheels 100 preferably each has a series of teeth 100T spaced apart along a circumference so as to create a series of pockets 100P. Reference is made to FIG. 21a. Here, each pocket 100P is located between the two teeth 100T of an adjacent pair of teeth. In the embodiment of FIGS. 15-21a, each pocket 100P is open in a radially outward direction, and the lock assembly 200 is configured such that when it is adjusted from its unlocked configuration to its locked configuration, the two detents 905 move radially inward so as to respectively engage (e.g., move into) two of the pockets 100P, including one on a first of the two wheels 100 and another on a second of the two wheels. This is perhaps best appreciated by referring to FIGS. 15 and 19.

In the embodiment of FIGS. 15-21b, the caster 10 is shown as being a hubless caster. In more detail, the illustrated caster is a hubless caster having a generally annular central frame member 500. The generally annular central frame member surrounds an open central corridor 505. The wheel lock assembly 200 can be located radially outward of a radially-outward-facing base surface of the generally annular central frame member. When the present caster 10 is a hubless caster, it may have two wheels 100 each configured to rotate about the first axis AX, and the wheel lock assembly 200 can be configured to lock (e.g., simultaneously) both wheels against rotation about the first axis. In such cases, the wheel lock assembly 200 can comprise two detents (or two portions of a detent) 905 each positioned adjacent a respective one of the two wheels 100. Preferably, when the caster 10 is in the locked configuration, the two wheels 100 are positively engaged on respective interior sides by the two detents (or the two portions of a detent) 905 of the wheel lock assembly 200, such that the two wheels are restrained against rotation about the first axis AX, and when the caster is in the unlocked configuration the two detents (or two detent portions) of the wheel lock assembly are spaced apart from the two wheels such that the two wheels are free to rotate about the first axis. The caster can optionally be configured such that the two detents (or two detent portions) move at least generally along a radius of the wheel(s) when the caster moves between its locked and unlocked configurations.

In the present embodiment, the caster 10 preferably is devoid of a swivel lock mechanism. In such cases, neither the wheel lock assembly 200, nor any other locking mechanism on the caster, is configured to prevent (e.g., lock against) swivel movement of the caster 10.

Thus, various embodiments of the invention are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A caster having a wheel and a wheel lock assembly, the wheel configured to rotate about a first axis, the wheel lock assembly configured to lock the wheel against rotation about the first axis, the wheel lock assembly including a rotatable track wall, a cam member, and a drive shaft, the rotatable track wall being generally cylindrical and configured to rotate about a second axis, the second axis being generally tangential to the wheel, the cam member being generally cylindrical and mounted adjacent, so as to be operably coupled with, the rotatable track wall, the cam member being mounted in an axially-fixed location so as to be restrained against moving axially along the second axis, the rotatable track wall having a smaller outer radius than the cam member and being nested inside the cam member, wherein the rotatable track wall and the cam member and the drive shaft are each centered on the second axis, the caster having a locked configuration and an unlocked configuration, wherein when the caster is in the locked configuration the wheel is positively engaged by a detent of the wheel lock assembly such that the wheel is restrained against rotation about the first axis, and when the caster is in the unlocked configuration the detent of the wheel lock assembly is spaced apart from the wheel such that the wheel is free to rotate about the first axis, the caster being configured such that the rotatable track wall simultaneously moves axially along, and rotates about, the second axis when the caster is adjusted between its locked and unlocked configurations, and the caster is devoid of a swivel lock mechanism, and the drive shaft is configured to move axially along the second axis when the caster is adjusted between the locked position and the unlocked position, wherein the drive shaft is nested inside the rotatable track wall, and further comprising a coil spring mounted around the drive shaft so as to be located inside both the rotatable track wall and the cam member.

2. The caster of claim 1 wherein the first and second axes are orthogonal to each other.

3. The caster of claim 1 wherein the caster is a hubless caster having a generally annular central frame member, the generally annular central frame member surrounding an open central corridor, the open central corridor centered on the first axis.

4. The caster of claim 1 wherein the cam member is maintained in a stationary position relative to the second axis.

5. The caster of claim 1 wherein the rotatable track wall and the drive shaft are coupled such that the rotatable track wall is free to rotate relative to the drive shaft but moves axially together with the drive shaft.

6. The caster of claim 1 wherein the rotatable track wall has a recessed track, and the cam member has three or more circumferentially spaced-apart posts that project radially inwardly from the cam member and are received in the recessed track of the rotatable track wall.

7. The caster of claim 1 wherein the drive shaft has a length that extends between two ends of the drive shaft, the drive shaft having an entirety of its length lying on the second axis.

8. The caster of claim 7 wherein the wheel lock assembly includes a wedge coupled to the drive shaft, the wedge defining the detent of the wheel lock assembly.

9. The caster of claim 8 wherein the wedge is coupled to the drive shaft by a pin, the wedge defining a slot in which the pin is received.

10. The caster of claim 8 wherein the drive shaft is nested inside both the rotatable track wall and the cam member.

11. The caster of claim 8 wherein the caster has two wheels each configured to rotate about the first axis, wherein the wheel lock assembly is configured to lock the two wheels against rotation about the first axis, wherein the wheel lock assembly comprises two detents each positioned adjacent a respective one of the two wheels, wherein when the caster is in the locked configuration the two wheels are positively engaged on respective interior sides by the two respective detents of the wheel lock assembly such that the two wheels are restrained against rotation about the first axis, and wherein when the caster is in the unlocked configuration the two detents of the wheel lock assembly are spaced apart from the two wheels such that the two wheels are free to rotate about the first axis.

12. The caster of claim 11 wherein the wedge defines both of the two detents of the wheel lock assembly.

13. A caster having a wheel and a wheel lock assembly, the wheel configured to rotate about a first axis, the wheel lock assembly configured to lock the wheel against rotation about the first axis, the wheel lock assembly including a rotatable track wall, the rotatable track wall comprising a generally cylindrical wall configured to rotate about a second axis, the caster having a locked configuration and an unlocked configuration, wherein when the caster is in the locked configuration the wheel is positively engaged by a detent of the wheel lock assembly such that the wheel is restrained against rotation about the first axis, and when the caster is in the unlocked configuration the detent of the wheel lock assembly is spaced apart from the wheel such that the wheel is free to rotate about the first axis, the caster being configured such that the rotatable track wall rotates about the second axis when the caster moves between its locked and unlocked configurations, wherein the caster has two wheels each configured to rotate about the first axis, wherein the wheel lock assembly is configured to lock the two wheels against rotation about the first axis, wherein the wheel lock assembly comprises two detents each positioned adjacent a respective one of the two wheels, wherein when the caster is in the locked configuration the two wheels are positively engaged on respective interior sides by the two respective detents of the wheel lock assembly such that the two wheels are restrained against rotation about the first axis, and wherein when the caster is in the unlocked configuration the two detents of the wheel lock assembly are spaced apart from the two wheels such that the two wheels are free to rotate about the first axis, and wherein the interior sides of the two wheels each has a series of teeth spaced apart along a circumference so as to create a series of pockets, each pocket being located between an adjacent pair of the teeth, and each pocket being open in a radially outward direction, the lock assembly configured such that when it is adjusted from its unlocked configuration to its locked configuration the two detents move radially inward so as to respectively engage two of the pockets including one on a first of the two wheels and another on a second of the two wheels.

14. The caster of claim 13 wherein the caster is devoid of a swivel lock mechanism.

15. A caster having a wheel and a wheel lock assembly, the wheel configured to rotate about a first axis, the wheel lock assembly configured to lock the wheel against rotation about the first axis, the wheel lock assembly including a rotatable track wall, the rotatable track wall comprising a generally cylindrical wall configured to rotate about a second axis, the caster having a locked configuration and an unlocked configuration, wherein when the caster is in the locked configuration the wheel is positively engaged by a detent of the wheel lock assembly such that the wheel is restrained against rotation about the first axis, and when the caster is in the unlocked configuration the detent of the wheel lock assembly is spaced apart from the wheel such that the wheel is free to rotate about the first axis, the caster being configured such that the rotatable track wall rotates about the second axis when the caster moves between its locked and unlocked configurations, wherein the wheel lock assembly includes a drive shaft, the drive shaft configured to move axially along the second axis when caster is adjusted between its unlocked and locked configurations, wherein the wheel lock assembly includes a wedge coupled to the drive shaft, the wedge defining the detent of the wheel lock assembly, wherein the wedge is coupled to the drive shaft by a pin, the wedge defines a slot in which the pin is received, and the slot extends along a path that includes at least one curve or angled turn.

\* \* \* \* \*